US008270019B2

(12) United States Patent
Ataka

(10) Patent No.: US 8,270,019 B2

(45) Date of Patent: Sep. 18, 2012

(54) PRINT OUTPUT APPARATUS AND PRINT OUTPUT SYSTEM

(75) Inventor: Hiroyuki Ataka, Osaka (JP)

(73) Assignee: Sharp Kabushiki Kaisha, Osaka-Shi, Osaka (JP)

( * ) Notice: Subject to any disclaimer, the term of this patent is extended or adjusted under 35 U.S.C. 154(b) by 725 days.

(21) Appl. No.: 12/453,049

(22) Filed: Apr. 28, 2009

(65) Prior Publication Data

US 2009/0268244 A1 Oct. 29, 2009

(30) Foreign Application Priority Data

Apr. 28, 2008 (JP) ................................ 2008-117476

(51) Int. Cl.
*H04N 1/04* (2006.01)
*H04N 1/32* (2006.01)
*G06F 3/12* (2006.01)

(52) U.S. Cl. ........................ 358/1.15; 358/498; 358/468

(58) Field of Classification Search .................. 271/248, 271/264; 347/85; 358/1.9, 1.15, 468, 498
See application file for complete search history.

(56) References Cited

U.S. PATENT DOCUMENTS 3,847,079 A * 11/1974 Dahlgren ..................... 101/490
6,267,517 B1 7/2001 Noda
2004/0188929 A1* 9/2004 Tada et al. ..................... 271/248
2006/0013468 A1* 1/2006 Dobberstein et al. ......... 382/151
2008/0230986 A1* 9/2008 Tada et al. ..................... 271/248
2009/0009783 A1* 1/2009 Negishi .......................... 358/1.9
2009/0243205 A1* 10/2009 Ishioka ......................... 271/264
2010/0079560 A1* 4/2010 Derimiggio et al. ............ 347/85

FOREIGN PATENT DOCUMENTS

JP 11-138975 5/1999
JP 2000-016683 1/2000
JP 2000-326567 11/2000
JP 2006-012011 1/2006
JP 2006-021843 1/2006
JP 2007156730 * 6/2007

* cited by examiner

*Primary Examiner* — Jerome Grant, II

(74) *Attorney, Agent, or Firm* — Edwards Wildman Palmer LLP; David G. Conlin; Stephen D. LeBarron

(57) ABSTRACT

The present invention includes an offset processing section that performs offset processing for shifting a sheet to be outputted in a sheet width direction, a banner output section that prints a job attribute of a print job on a sheet, a job attribute determination section that determines the job attribute of the print job, and a control section that sets offset processing or banner output in the unit of a job attribute or in the unit of a job. When a job attribute of a preceding print job and a job attribute of a subsequent print job are different, offset processing and banner output are executed. When the job attribute of the preceding print job and the job attribute of the subsequent print job are the same, any one of offset processing and banner output is executed. Thereby, printed sheets can be easily obtained in the unit of a job attribute such as in the unit of a user.

17 Claims, 18 Drawing Sheets

FIG. 3

| | | | | | | | | |
|---|---|---|---|---|---|---|---|---|
| HOST NAME | IP ADDRESS | USER NAME | GROUP NAME | JOB NAME | PRINTER DRIVE NAME | DOUBLE-SIDED | STAPLING | PUNCHING |

FIG. 13 (1A)
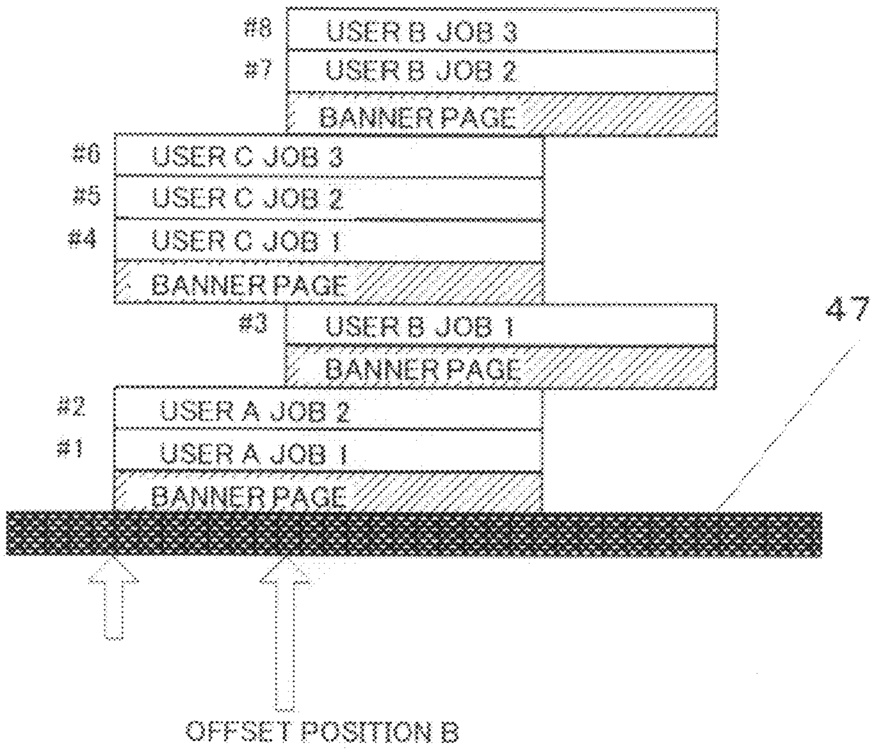
FIG. 13 (2A)
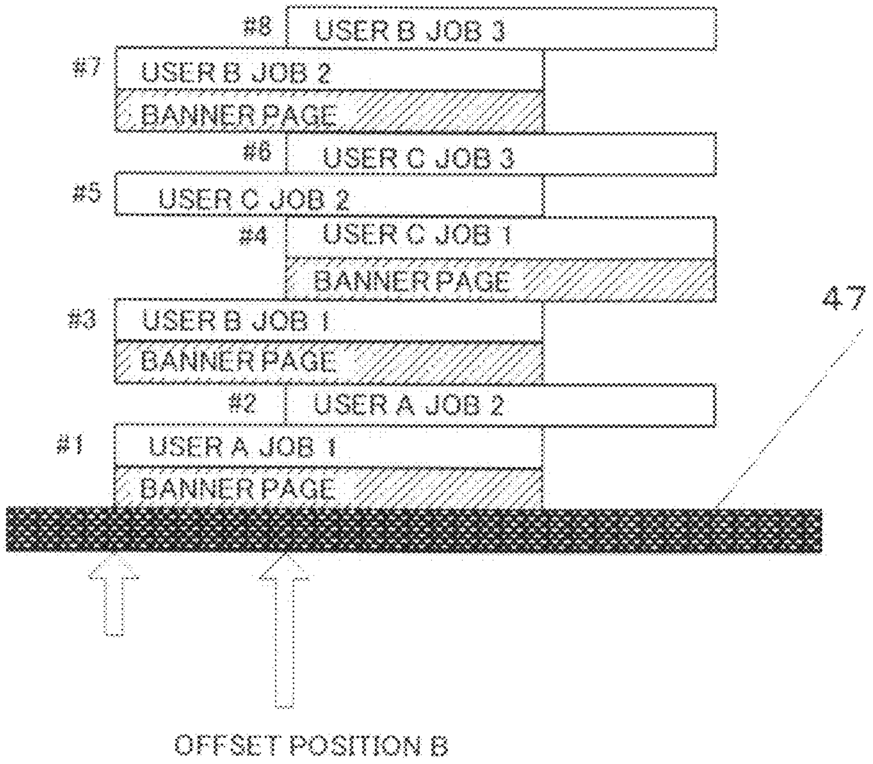

FIG. 14 (3A)
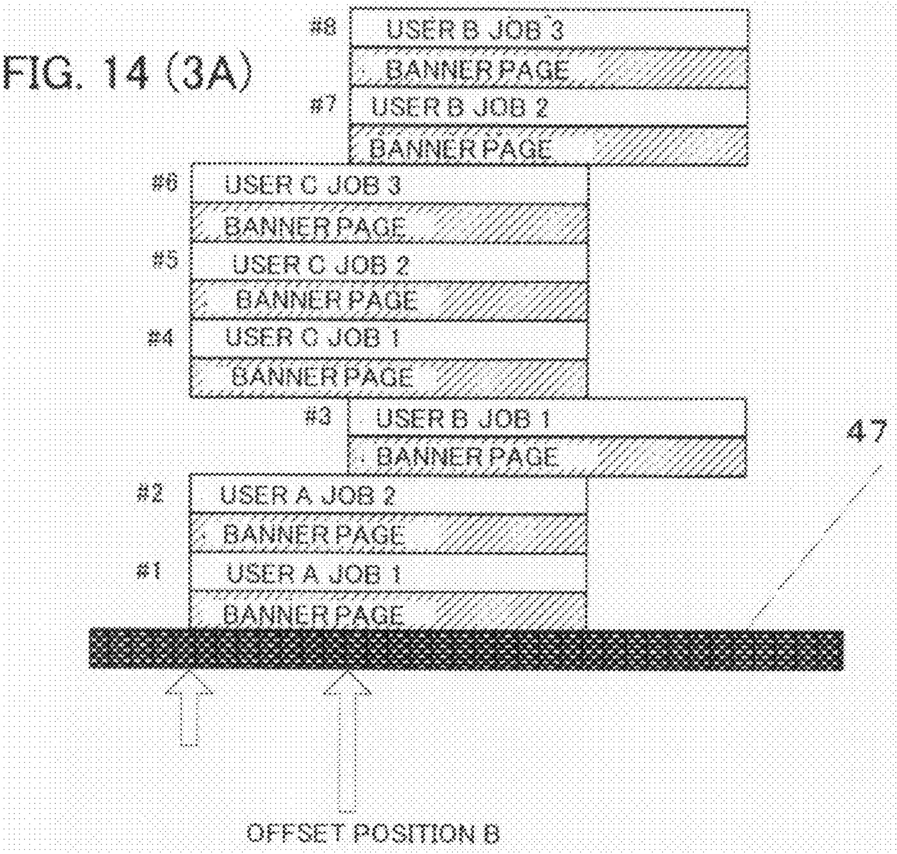
FIG. 14 (4A)
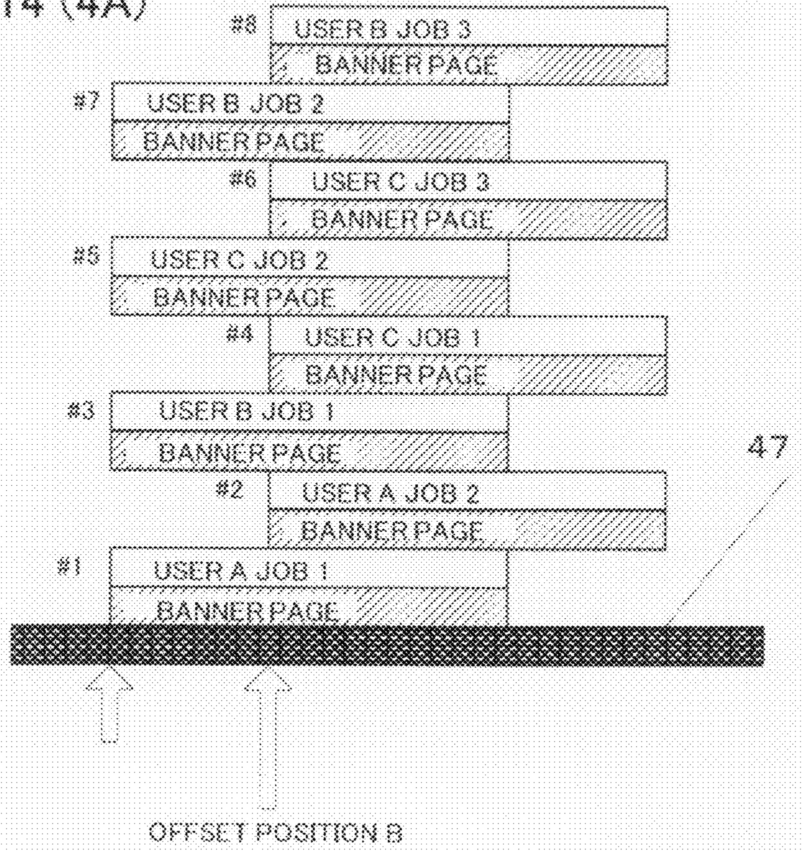

FIG. 17 (1B)
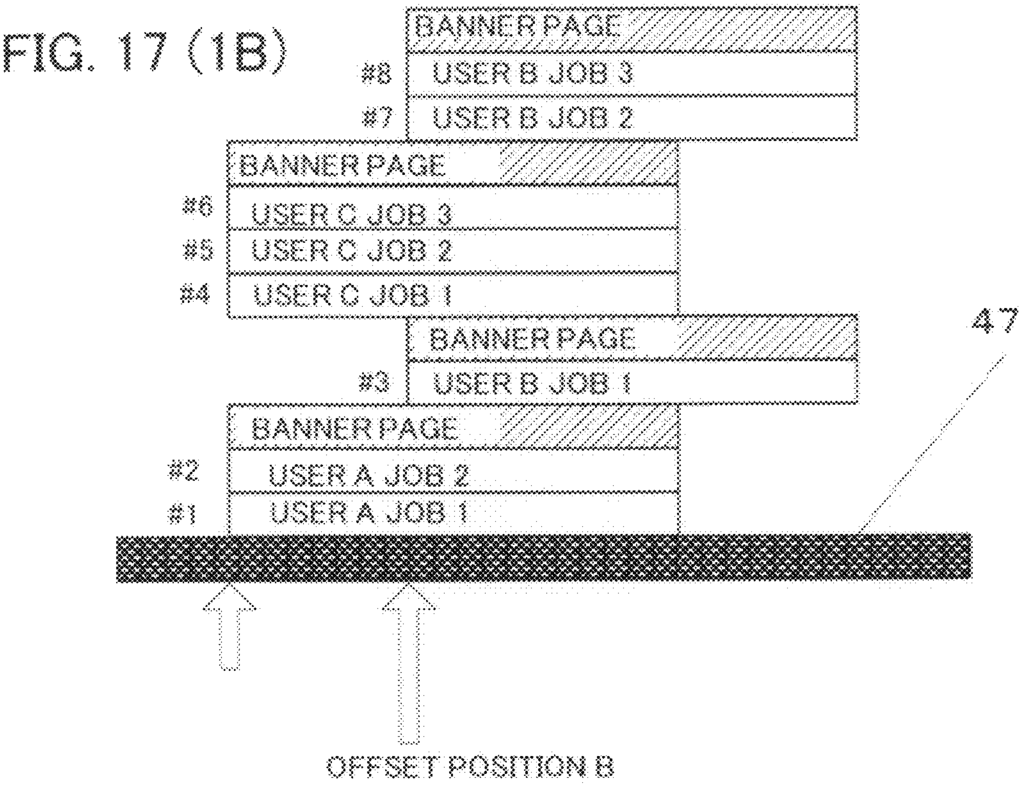
FIG. 17 (2B)
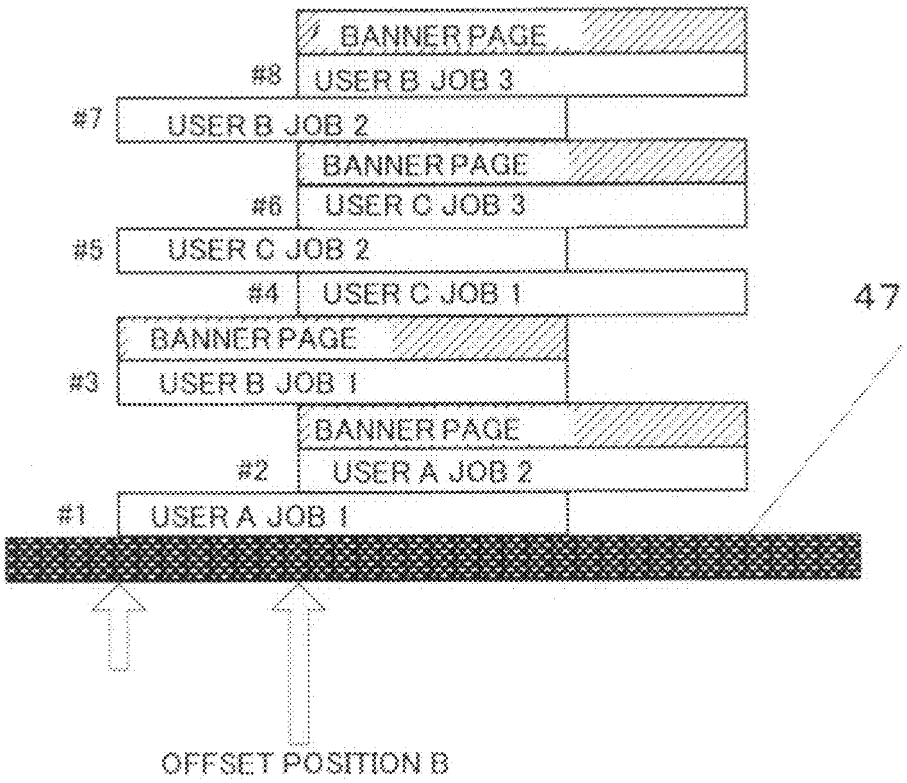

FIG. 18 (3B)
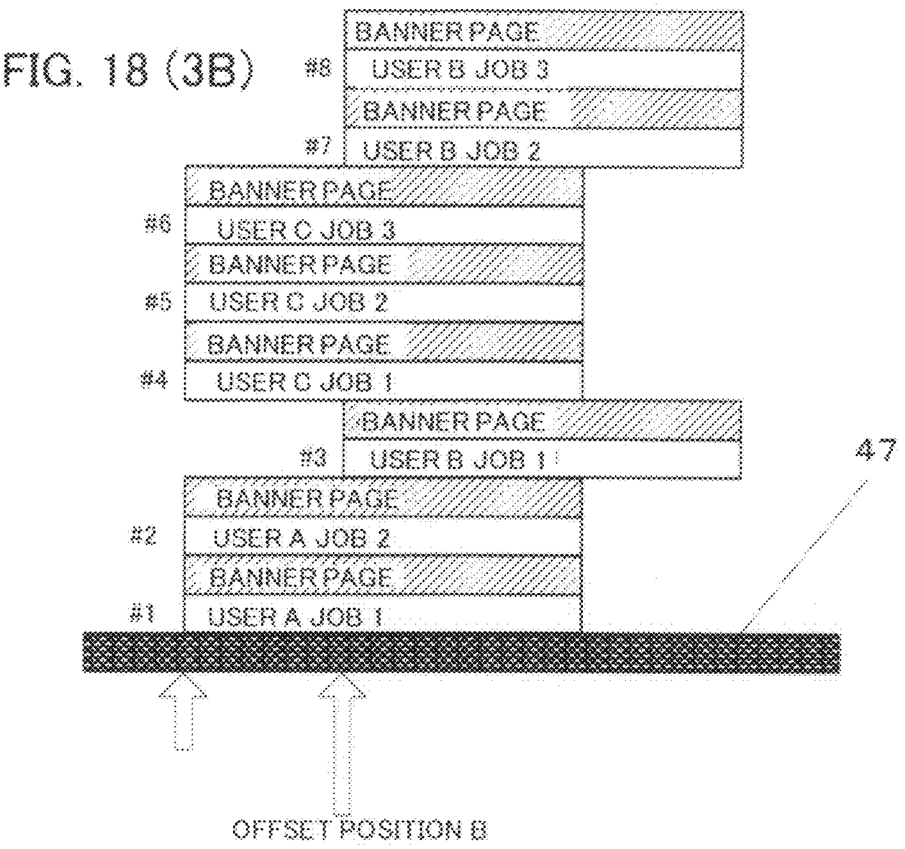
FIG. 18 (4B)
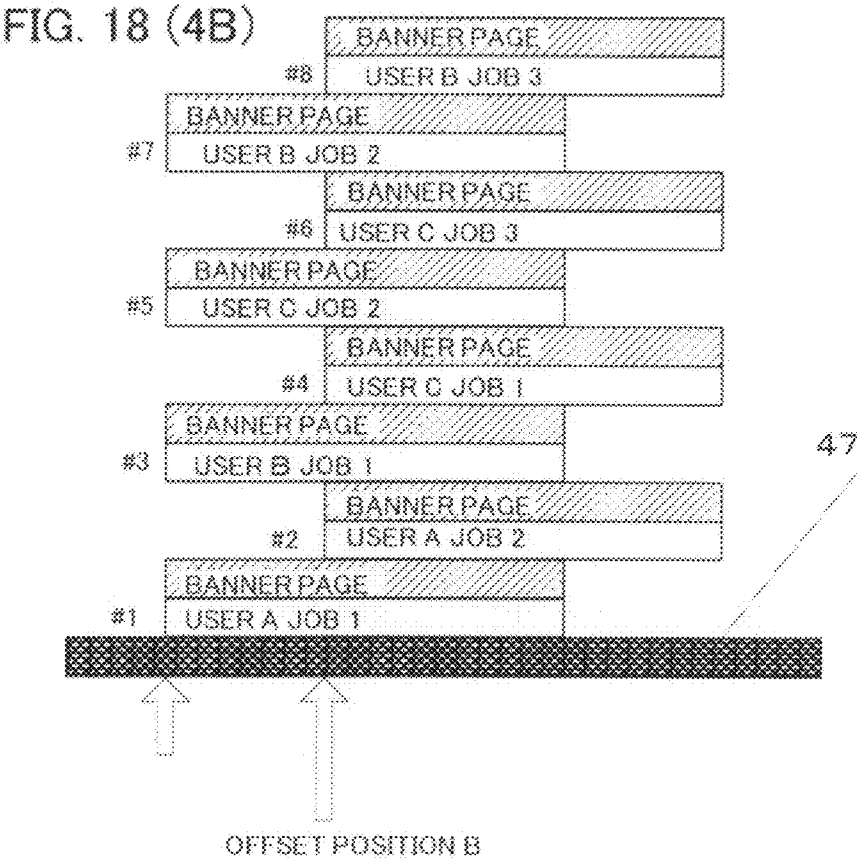

PRINT OUTPUT APPARATUS AND PRINT OUTPUT SYSTEM

BACKGROUND OF THE INVENTION

1. Field of the Invention

The present invention relates to a print output apparatus that prints and outputs an inputted print job on a sheet.

2. Description of the Related Art

In a print output apparatus, when a print job is inputted, an image of the print job is printed on a sheet and the sheet is outputted. The print output apparatus connected to a network is used by a plurality of users.

When print jobs by respective users are printed, offset processing is performed as described in Japanese Laid-Open Patent No. 2006-21843 in order to classify sheets that have been ejected onto a tray for each print job. By the offset processing, sheets are outputted so as to be shifted in a sheet width direction, in which an ejected position of the sheets is different for each print job.

Moreover, in the print output apparatus, banner output is performed, in which a banner page is printed before a first page of a print job. The banner output is performed for each print job and the banner page makes it possible to identify the beginning of sheets in one print job.

It is described in Japanese Laid-Open Patent No. 2006-12011 that offset processing and banner output are performed in the unit of a job. Thereby, a banner page is easily recognized and printed sheets are easily obtained for each print job.

SUMMARY OF THE INVENTION

When offset processing and banner output are executed in the unit of a job, the delimit for each print job is recognized. However, in a case where print jobs by a plurality of users are printed, even when the offset processing and the banner output are executed in the unit of a job, the delimit for each user is not recognized. That is, a user is one of job attributes of a print job and the delimit for each user is not recognized. In order to obtain printed sheets in the unit of a job attribute such as in the unit of a user, a user is required to confirm the sheets for each job, which is a burden on the user.

In view of above, it is an object of the present invention to provide a print output apparatus capable of differentiating printed sheets easily in the unit of a job attribute.

The present invention provides a print output apparatus that prints and outputs an image of an inputted print job on a sheet, comprising an offset processing section that performs offset processing for shifting a sheet to be outputted in a sheet width direction, a banner output section that prints a job attribute of a print job on a sheet, a job attribute determination section that determines the job attribute of the print job, and a control section that sets offset processing or banner output in the unit of a job attribute or in the unit of a job.

Offset processing and banner output are executed in the unit of a job attribute, thereby printed-sheets are divided and outputted in accordance with the job attribute, such as for each user or for each group. As a result, it is possible to obtain sheets of relevant print jobs collectively.

The control section causes offset processing and banner output to be executed, when a job attribute of a preceding print job and a job attribute of a subsequent print job are different. Alternatively, when the job attribute of the preceding print job and the job attribute of the subsequent print job are the same, the control section causes any one of offset processing and banner output to be executed.

That is, the control section sets respective patterns such that banner output is executed in the unit of a job attribute as well as offset processing is executed in the unit of a job; offset processing is executed in the unit of a job attribute as well as banner output is executed in the unit of a job; or when the job attribute of the preceding print job and the job attribute of the subsequent print job are the same, offset processing and banner output are not executed.

In this way, a sheet outputted when the job attributes are different is outputted in a different condition from that of a previously outputted sheet. Thereby, sheets outputted for each job attribute can be easily identified and are easily obtained collectively.

Banner output is executed before a first page of the print job is outputted, or after a last page of the print job is outputted. Therefore, the control section sets whether to execute banner output before outputting the first page or after outputting the last page.

A sheet subjected to banner output is ejected either face-up or face-down. Therefore, the control section sets whether to eject the sheet face-up or face-down.

The sheet subjected to banner output is different in kind from the sheet on which the image of the print job has been printed. The control section sets a sheet such that the sheet to be used for banner output and the sheet to be used for the print job are different in kind. In addition, the control section sets whether to execute banner output on a single sheet or on a plurality of sheets.

In a setting for offset processing and banner output, the control section performs this setting by input from an operation panel. Alternatively, by input from an information processing apparatus that is communicatively connected through a network to the print output apparatus, the control section of the print output apparatus performs this setting.

According to the present invention, it is possible to distinguish and output sheets for a print job in the unit of a job attribute. Thereby, sheets of relevant print jobs, such as for each user, are put together and users are able to easily obtain the relevant sheets collectively.

BRIEF DESCRIPTION OF THE DRAWINGS

FIG. 3 is a view showing a job attribute table;

FIG. 13 (1A) is a view showing a state when a sheet is outputted in a first pattern and FIG. 13 (2A) is a view showing a state when a sheet is outputted in a second pattern;

FIG. 14 (3A) is a view showing a state when a sheet is outputted in a third pattern and FIG. 14 (4A) is a view showing a state when a sheet is outputted in a fourth pattern;

FIG. 17 (1B) is a view showing a state when a sheet is outputted in a first pattern and FIG. 17 (2B) is a view showing a state when a sheet is outputted in a second pattern; and FIG. 18 (3B) is a view showing a state when a sheet is outputted in a third pattern and FIG. 18 (4B) is a view showing a state when a sheet is outputted in a fourth pattern.

DETAILED DESCRIPTION OF THE PREFERRED EMBODIMENTS

Figure 1:
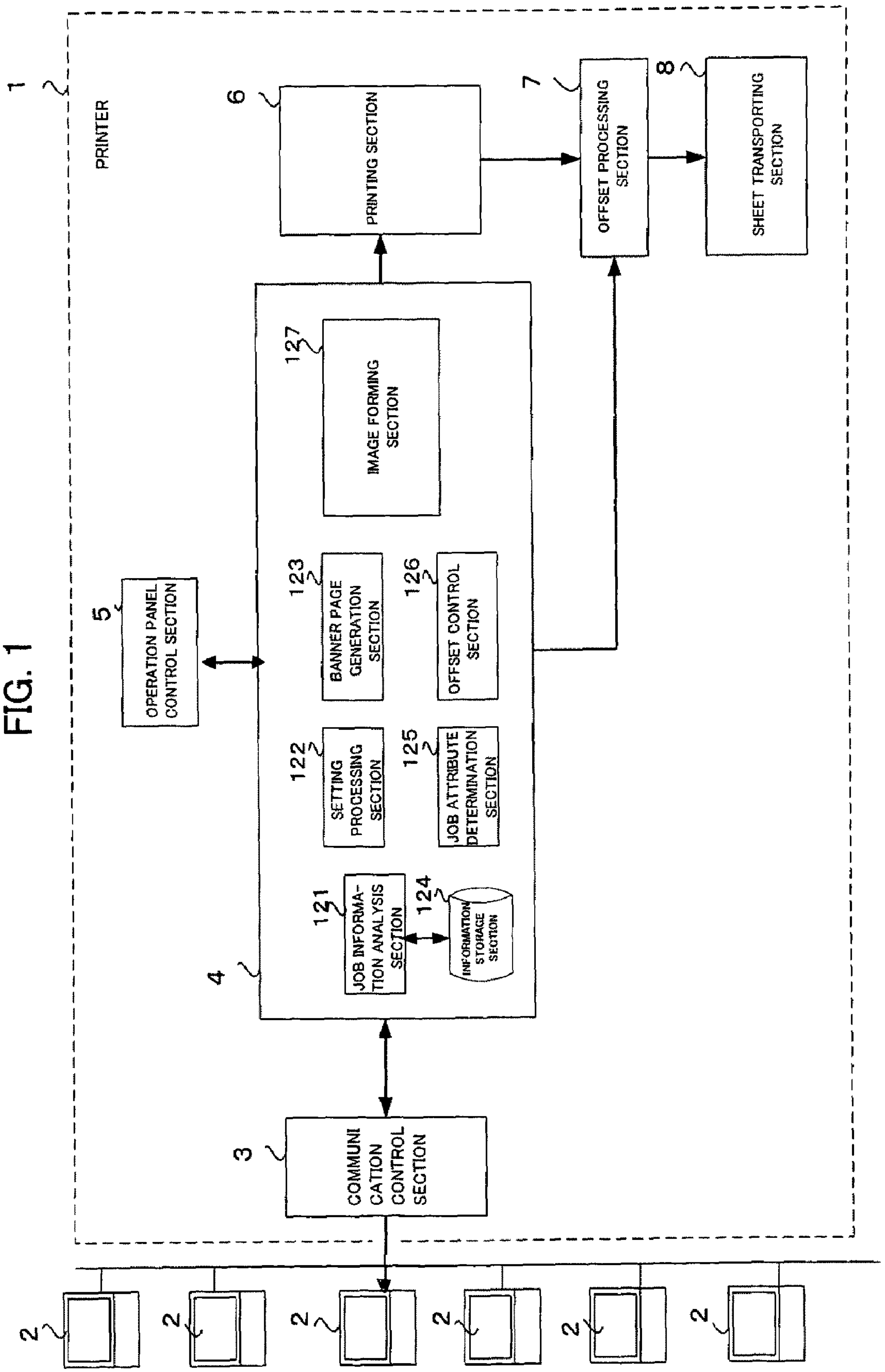
FIG. 1 is a functional block diagram of a print output apparatus.

FIG. 1 illustrates a print output apparatus of the present embodiment. The print output apparatus 1 is an image forming apparatus for performing copying and printing, which reads a document to obtain image data in the case of copying, and receives image data from outside in the case of printing. Then, an image expressed by inputted image data is printed onto a sheet to be outputted.

The print output apparatus 1 includes a communication control section 3 for receiving a print job from an external information processing apparatus 2, a main control section 4 composed of a CPU, an ROM, an RAM and the like, an operation panel control section 5 for controlling an operation panel having a display section, a printing section 6 for printing an image formed from print data of the print job onto a sheet, an offset processing section 7 for offset-processing the sheet having the image printed thereon, and a sheet transporting section 8 for transporting a sheet to be printed and ejecting the sheet outside the apparatus.

The print output apparatus 1 is connected to a network such as a LAN and a wireless LAN and is capable of communicating with a plurality of the information processing apparatuses 2 through the network. The print output apparatus 1 and the information processing apparatuses 2 constitute a print output system. The information processing apparatus 2 such as a personal computer or a work station has a printer driver, creates a print job from predetermined document data, and instructs printing. The communication control section 3 communicates with the information processing apparatus 2 through the network and receives the print job from the information processing apparatus 2. As communication means with the outside, using a USB connection, a parallel interface and the like, the information processing apparatus 2 may be directly connected to the outside, or may be connected to a recording medium such as a USB memory or a memory card may be connected to receive input of the print job.

Figure 2:
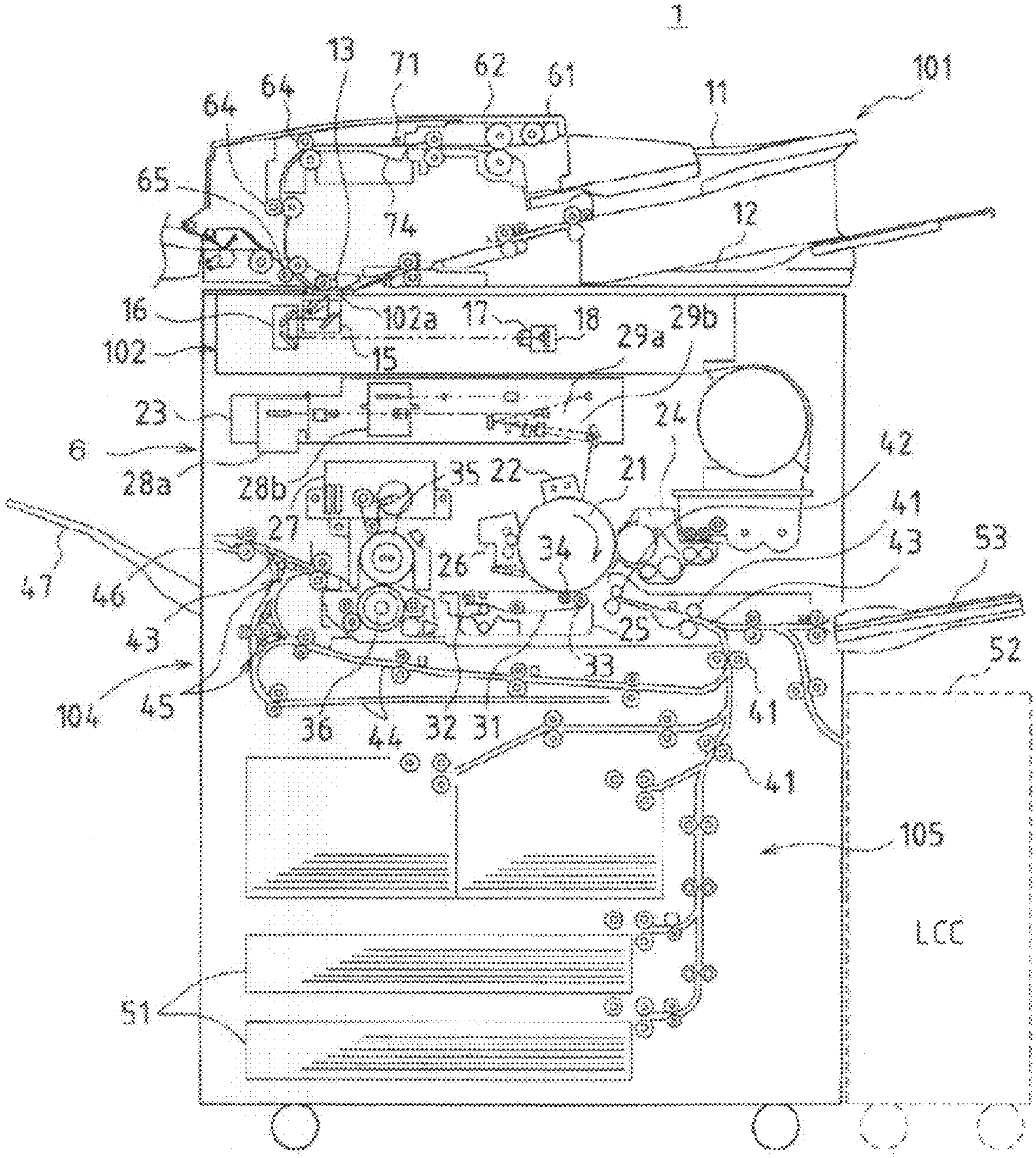
FIG. 2 is a schematic structural view of the print output apparatus of the present invention.

As shown in FIG. 2, the print output apparatus 1 is mainly constituted by a document feeding section (ADF) 101, an image reading section 102, the printing section 6, a sheet transporting section 104 and a sheet feeding section 105.

In the document feeding section 101, when at least one sheet of a document is set in a document setting tray 11, the document is drawn out one by one from the document setting tray 11 and transported. The document passes through a document reading window 102*a* of the image reading section 102 and is ejected to an ejection tray 12.

Above the document reading window 102*a*, a CIS (Contact Image Sensor) 13 is disposed. While the document passes through the document reading window 102*a*, the CIS 13 reads an image on the rear face of the document in a main scanning direction repeatedly and outputs read image data.

Further, in the image reading section 102, while the document passes through the document reading window 102*a*, the surface of the document is exposed by a lamp of a first scanning unit 15. Reflected light from the surface of the document is guided by mirrors of the first scanning unit 15 and a second scanning unit 16 to an imaging lens 17. An image on the surface of the document is formed by the imaging lens 17 on a CCD (Charge Coupled Device) 18. The CCD 18 reads the image on the surface of the document in the main scanning direction repeatedly and outputs read image data.

When the document is placed on a platen glass on the top surface of the image reading section 102, the first and second scanning units 15 and 16 are moved while maintaining a predetermined speed relationship with each other and the surface of the document on the platen glass is exposed by the lamp of the first scanning unit 15. Reflected light from the surface of the document is guided by the first and second scanning units 15 and 16 to the imaging lens 17. The image on the surface of the document is formed by the imaging lens 17 on the CCD 18.

The image data outputted from the CIS 13 or the CCD 18 is inputted into the main control section, and the main control section performs various image processing with respect to the image data and outputs the processed image data to the printing section 6.

The printing section 6 records an image based on the image data on a sheet, and includes a photoreceptor drum 21, a charging unit 22, a laser write unit 23, a developing unit 24, a transfer unit 25, a cleaning unit 26, a fixing unit 27 and the like.

The photoreceptor drum 21 is rotationally driven in one direction. The cleaning unit 26 cleans the surface of the photoreceptor. The charging unit 22 charges the surface of the photoreceptor uniformly. Note that, the charging unit 22 may be in a charger type, or in a roller type or a brush type that is in contact with the photoreceptor drum 21.

The laser write unit 23 is a laser scanning unit (LSU) that includes two laser irradiating sections 28*a* and 28*b*, and two mirror groups 29*a* and 29*b*. In the laser write unit 23, laser light corresponding to the inputted image data is emitted from each of the laser irradiating sections 28*a* and 28*b*. The photoreceptor drum 21 is irradiated with the laser light through each of the mirror groups 29*a* and 29*b*. The uniformly charged surface of the photoreceptor drum 21 is exposed and an electrostatic latent image is formed on the surface of the photoreceptor drum 21.

The laser write unit 23 employs a two-beam method in which the two laser irradiating sections 28*a* and 28*b* are provided to respond to high-speed print processing, which reduces a burden accompanied by acceleration of a irradiation timing.

Note that, for the laser write unit 23, an EL write head or an LED write head in which light emitting elements are aligned in an array is also usable instead of the laser scanning unit.

The developing unit 24 supplies toner to the surface of the photoreceptor drum 21, develops the electrostatic latent image, and forms a toner image on the surface of the photoreceptor drum 21. The transfer unit 25 transfers the toner image on the surface of the photoreceptor drum 21 onto a sheet transported by the sheet transporting section 104. The fixing unit 27 applies heat and pressure to the sheet to fix the toner image on the sheet. Thereafter, the sheet is transported and ejected by the sheet transporting section 104 to the ejection tray 47. Further, the cleaning unit 26 removes and collects toner remaining on the surface of the photoreceptor drum 21 after development and transfer.

The transfer unit 25 includes a transfer belt 31, a driving roller 32, a driven roller 33, an elastic conductive roller 34 and the like. The transfer belt 31 is stretched around each of the rollers 32 to 34 and other rollers, and is rotated by driving of the driving roller 32. The transfer belt 31 has a predetermined resistance value, for example, $1\times10^{9}$ to $1\times10^{13}$ Ω/cm and transports the sheet placed on the surface thereof. The elastic conductive roller 34 is pressed against the photoreceptor drum 21 through the transfer belt 31 and presses the sheet on the transfer belt 31 against the surface of the photoreceptor drum 21. An electrical field with an opposite polarity to an electrical charge of the toner image on the surface of the photoreceptor drum 21 is applied to the elastic conductive roller 34, and by the electrical field with the opposite polarity, the toner image on the surface of the photoreceptor drum 21 is transferred onto the sheet on the transfer belt 31. For example, when the toner image has an electrical charge with (−) polarity, the polarity of the electrical field that is applied to the elastic conductive roller 34 is made (+) polarity.

The fixing unit 27 includes a heat roller 35 and a pressure roller 36. Provided inside the heat roller 35A is a heat source for heating the surface of the roller to a predetermined temperature (fixing temperature: generally 160 to 200° C.). Further, pressure members (not shown) are disposed at both ends of the pressure roller 36 such that the pressure roller 36 is pressed against the heat roller 35 at a predetermined pressure. When the sheet is, transported to a press section (referred to as a fixing nip section) between the heat roller 35 and the pressure roller 36, the sheet is transported by each of the rollers 35 and 36 as well as an unfixed toner image on the sheet is heated and melted and then pressurized, thus the toner image is fixed on the sheet.

The sheet transporting section 104 includes a plurality of pairs of transporting rollers 41 for transporting a sheet, a pair of resist rollers 46, a transporting path 43, a reverse transporting path 44, a plurality of branch catches 45, a pair of ejection rollers 46 and the like.

The sheet feeding section 105 includes a plurality of sheet feeding trays 51. Each of the sheet feeding trays 51 is a tray for accumulating sheets and is provided below the printing section 6. Further, each of the sheet feeding trays 51 includes a pick up roller for drawing out sheets one by one, and the like. The drawn out sheet is sent to the transporting path 43 of the sheet transporting section 104. For the purpose of high-speed print processing, each of the sheet feeding trays 51 has a capacity capable of storing 500 to 1500 sheets in a regular size.

Further, as the sheet feeding section 105, a large capacity cassette (LCC) 52 capable of storing various types of sheets in a large volume and a manual feeding tray 53 for mainly feeding sheets in a irregular size are provided.

The sheet fed from the sheet feeding section 105 is transported on the transporting path 43 until the leading end of the sheet reaches the resist roller 42. The resist roller 42 is temporarily stopped, thus when the leading end of the sheet comes in contact with the resist roller 42, the sheet bows. By the elastic force of the bowed sheet, the leading end of the sheet is aligned in parallel with the resist roller 42. Thereafter, the rotation of the resist roller 42 is started and the sheet is transported by the resist roller 42 to the transfer unit 25 of a printing section 103. The sheet after fixing is transported by the ejection roller 46 to the ejection tray 47.

The stoppage and rotation of the resist roller 42 are performed by switching on/off a clutch between the resist roller 42 and a driving shaft, or by switching on/off a motor as a driving source of the resist roller 42.

By the sheet being transported as described above, an image is printed and recorded on the surface of the sheet. When an image is also recorded on the rear face of the sheet, a branch path between the transporting path 43 and the reverse transporting path 44 are switched by the rotation of the branch catches 45. The transported sheet is turned upside down in the reverse transporting path 44 and returns through the reverse transporting path 44 to the resist roller 42 on the transporting path 43. Thereby, the image is also recorded on the rear face of the sheet.

On the transporting path 43 and the reverse transporting path 44, sensors for detecting the position of the sheet or the like are disposed at various location. Based on the position of the sheet detected by each of the sensors, the main control section 4 controls driving of the transporting roller 41 and the resist roller 42 to perform transporting and positioning of the sheet.

The ejection tray 47 is disposed in the side face opposite to the manual feeding tray 53. Instead of the ejection tray 47, it is also possible to provide a post-processing apparatus that performs post-processing (stapling, punching processing, offset stacking and the like) for the sheet, or to dispose a plurality of levels of ejection trays as an option.

When the sheet that has passed through the fixing unit 27 is transported from the ejection roller 46 to the ejection tray 47 as it is, the sheet is placed on the ejection tray 47 with the printed face turned upward. That is, the sheet is ejected face-up.

In contrast, when the sheet is ejected face-down, the sheet that has passed through the fixing unit 27 is guided by the branch catches 45 to the reverse transporting path 44. When the rear end of the sheet passes through the branch catches 45 on the near side of the transporting path 43, the rollers in the reverse transporting path 44 are rotated reversely so as to transport the sheet in a direction of the ejection roller 46 and to eject the sheet to the ejection tray 47. The sheet is placed on the ejection tray 47 with the printed face turned downward.

In the present print output apparatus 1, offset processing in which the printed sheet is outputted so as to be shifted in a sheet width direction is performed. A method for the offset processing includes a method in which a post-processing apparatus is equipped and the ejection tray 47 provided in the post-processing apparatus is moved in a direction perpendicular to a sheet transporting direction, a method in which sheets are stacked on a staple tray of the post processing apparatus, on which sheets to be stapled are stacked, and a bundle of sheets is moved by sheet aligning means of the staple tray in a direction perpendicular to the sheet transporting direction, thereafter, the bundle of sheet is ejected on the ejection tray 47, and a method in which, when the proximity of the rear end of the sheet reaches a nip section of the ejection roller 46, the ejection roller 46 is moved in a direction perpendicular to the sheet transporting direction and the sheet is ejected. The present print output apparatus 1 employs any one of these methods.

According to the employed method, the offset processing section 7 drives any of the ejection tray 47, the sheet aligning means and the ejection roller 46. Thereby, the sheets are outputted so as to be shifted in the width direction. Note that, it is possible to set an offset position on the ejection tray 47 on which the sheets are ejected at two or more locations.

The present print output apparatus 1 includes the offset processing section 7 and a banner output section for printing and outputting a banner page. When an image is printed and outputted on a sheet with these sections corresponding to an inputted print job, offset processing is executed, as well as a separation mode in which banner output is executed to print the banner page is performed. In the separation mode, printed sheets are outputted such that a plurality of relevant print jobs are put together by combining the offset processing and the banner output in accordance with set conditions.

The main control section 4 has a job analysis processing section 121 that analyzes a job attribute of the inputted print job, a setting processing section 122 that processes setting information inputted through the operation panel control section 5 from the operation panel, a banner page generation section 123 that generates the banner page based on the job attribute, an information storage section 124 that stores the job attribute and the setting information, a job attribute determination section 125 that determines the job attribute of the print job, an offset control section 126 that controls the offset processing section 7 in accordance with the setting information, and an image forming section 127 that performs various image processing with respect to image data of the print job. Note that, the banner output section is constituted by the banner page generation section 123 and the printing section 6.

When the print job is created in the information processing apparatus 2, the job attribute is created as job information and applied to the print job. The job information in the job attribute includes a host name of the information processing apparatus 2, an IP address, a user name, a group name, a job name, a printer driver name, double-sided, stapling and punching.

The job analysis processing section 121 obtains job information contained in an externally inputted print job and extracts information about the job attribute from the job information. The extracted job attribute is stored as a job attribute table as shown in FIG. 3 in the information storage section 124 as a memory.

When an authorized user such as an administrator inputs the setting information for the separation mode from the operation panel, the setting processing section 122 decides a timing to execute the offset processing and the banner output in accordance with the setting information. The offset control section 126 operates the offset processing section 7 depending on the timing to execute the offset processing. The banner page generation section 123 creates an image based on information that can identify the print job as an image to be printed on the banner page. When the print job is inputted, the job attribute determination section 125 determines whether a job attribute of a preceding print job and a job attribute of the current print job are the same or different. The determination of the job attribute is performed with respect to information selected from a plurality of job information.

Then, in order to execute the separation mode, the main control section 4 sets the offset processing and the banner output in the unit of a job attribute and in the unit of a job. That is, when the job attribute of the preceding print job and the job attribute of the subsequent print job are different, the main control section 4 causes the offset processing and the banner output to be executed. When the job attribute of the preceding print job and the job attribute of the subsequent print job are the same, either the offset processing or the banner output is executed depending on the setting.

Further, the main control section 4 sets whether the banner page for the print job is outputted first-out or last-out in the banner output. In the case of first-out, the banner page is outputted before a first page of the print job is outputted. In the case of last-out, the banner page is outputted after a last page of the print job is outputted. Further, the main control section 4 sets whether the banner page is ejected face-down or ejected face-up in the banner output.

That is, the separation mode has four patterns. In a first pattern, the offset processing and the banner output are executed in the unit of a job attribute. When the job attributes are the same, the offset processing and the banner output are not executed in the unit of a job. That is, the offset processing and the banner output are executed in the unit of a job attribute.

In a second pattern, the offset processing and the banner output are executed in the unit of a job attribute. When the job attributes are the same, only the offset processing is executed in the unit of a job. That is, the offset processing is executed in the unit of a job, whereas the banner output is executed in the unit of a job attribute.

In a third pattern, the offset processing and the banner output are executed in the unit of a job attribute. When the job attributes are the same, only the banner output is executed in the unit of a job. That is, the offset processing is executed in the unit of a job attribute, whereas the banner output is executed in the unit of a job.

In a fourth pattern, the offset processing and the banner output are executed in the unit of a job attribute. When the job attributes are the same, the offset processing and the banner output are executed also in the unit of a job. That is, regardless of the job attributes, the offset processing and the banner output are executed in the unit of a job.

Figure 4:
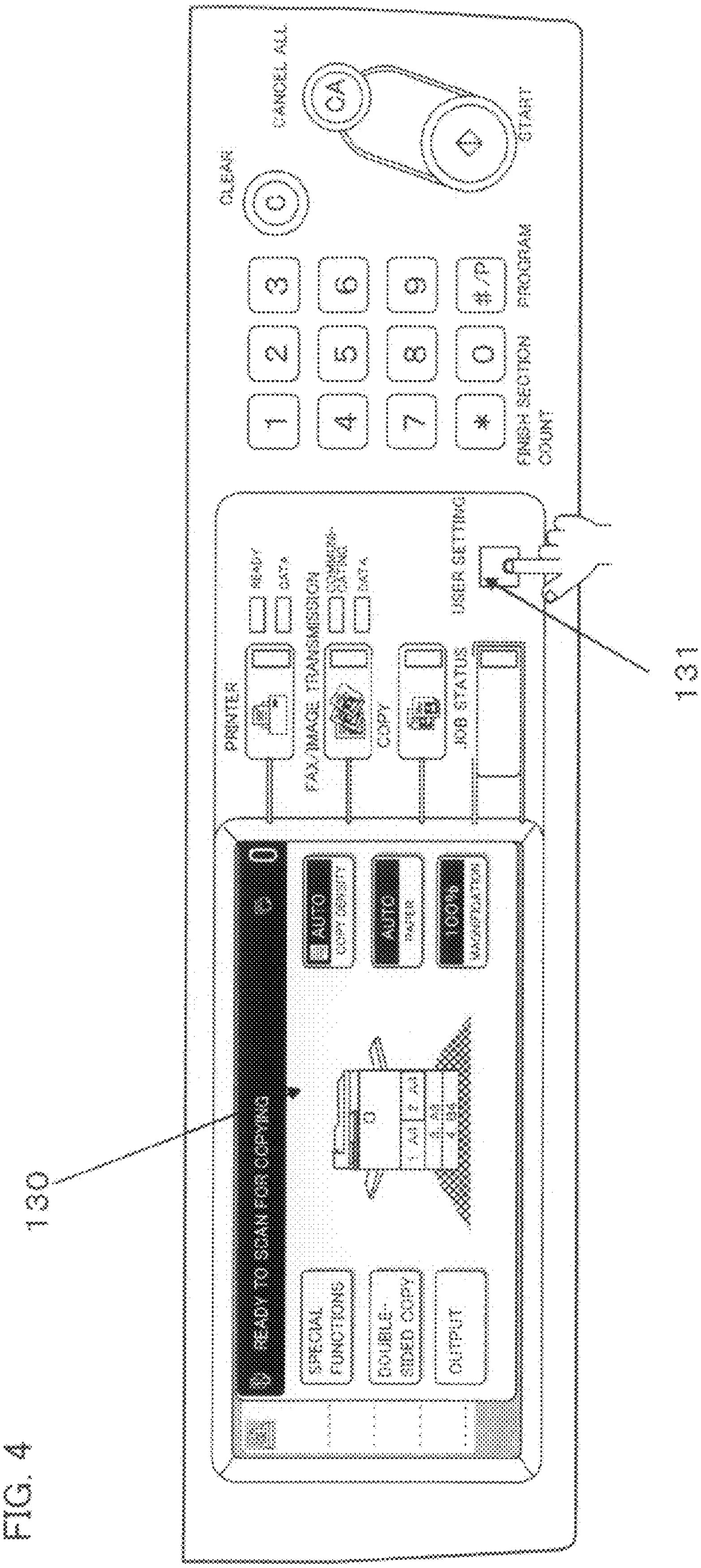
FIG. 4 is a view showing an operation panel.
Figure 5:
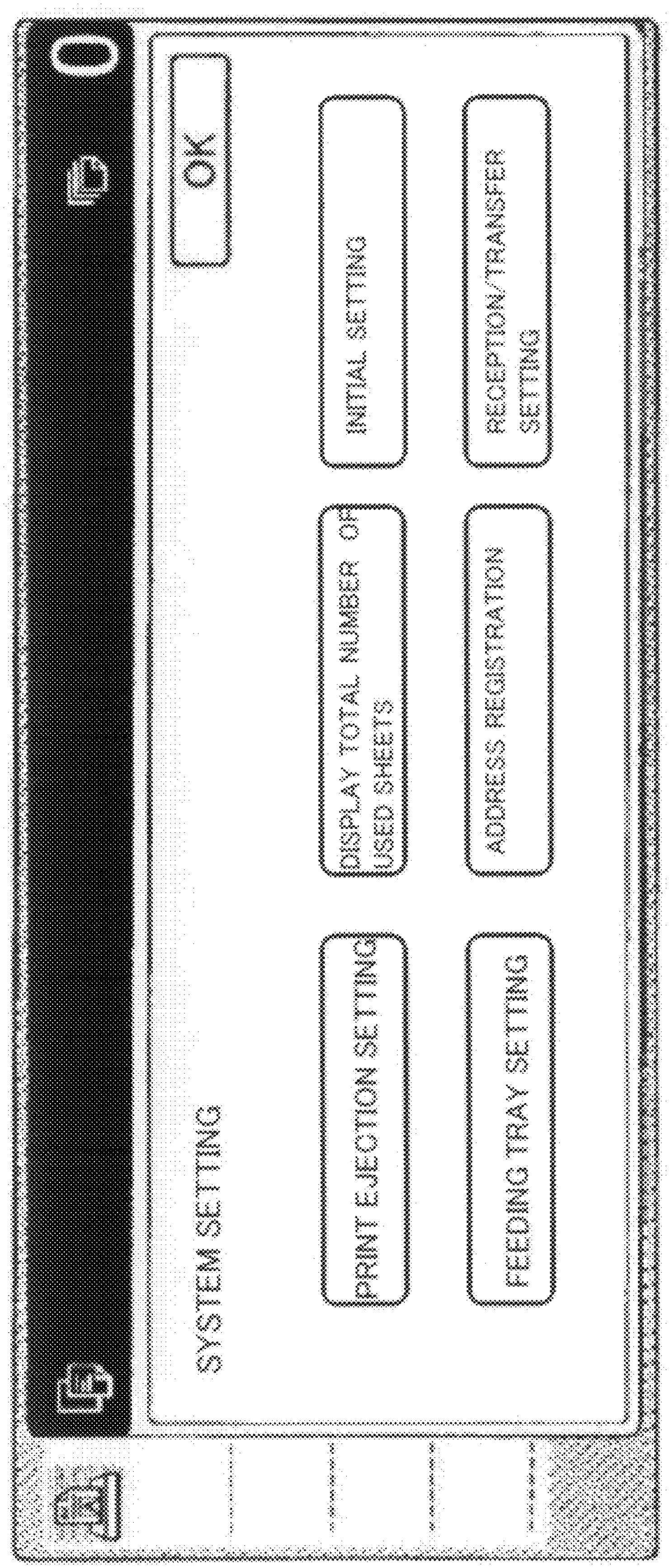
FIG. 5 is a view showing a selection screen for a system setting.

When a user performs a setting for the separation mode, the user operates the operation panel to perform input. As shown in FIG. 4, the operation panel includes a touch panel 130 as a display section. When the user operates a system setting button 131, a setting screen shown in FIG. 5 is displayed on a screen of the touch panel 130. When a “print ejection setting” is selected on the setting screen, a setting screen for the delimit mode shown in FIG. 6 is displayed.

Before switching to this setting screen, the main control section 4 displays a screen for requesting user authentication to perform the user authentication. The authenticated user is allowed to set the separation mode, while an unauthorized user is prohibited from setting. This authentication makes it possible to prevent an unnecessary change in the setting by the unauthorized user, which prevents that users using the print output apparatus 1 are confused.

Figure 6:
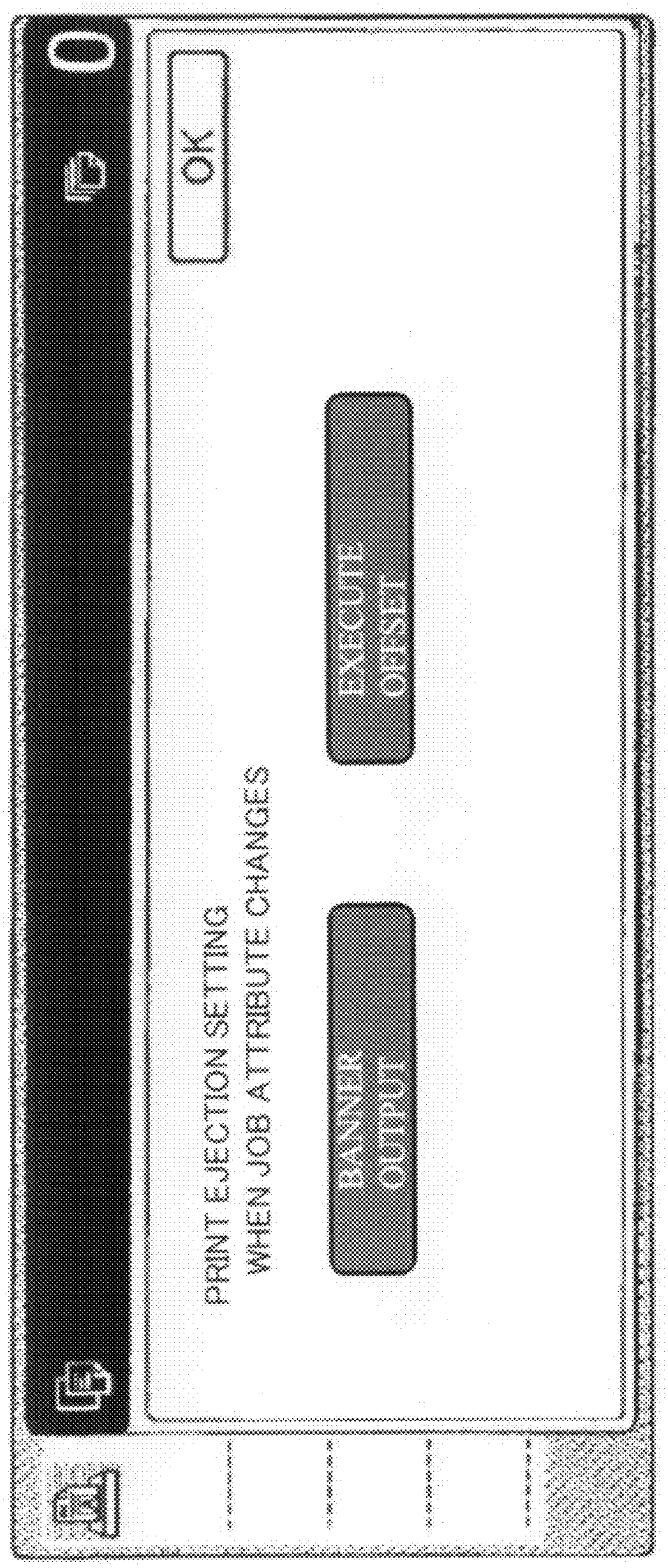
FIG. 6 is a view showing a setting screen for a delimit mode.
Figure 7:
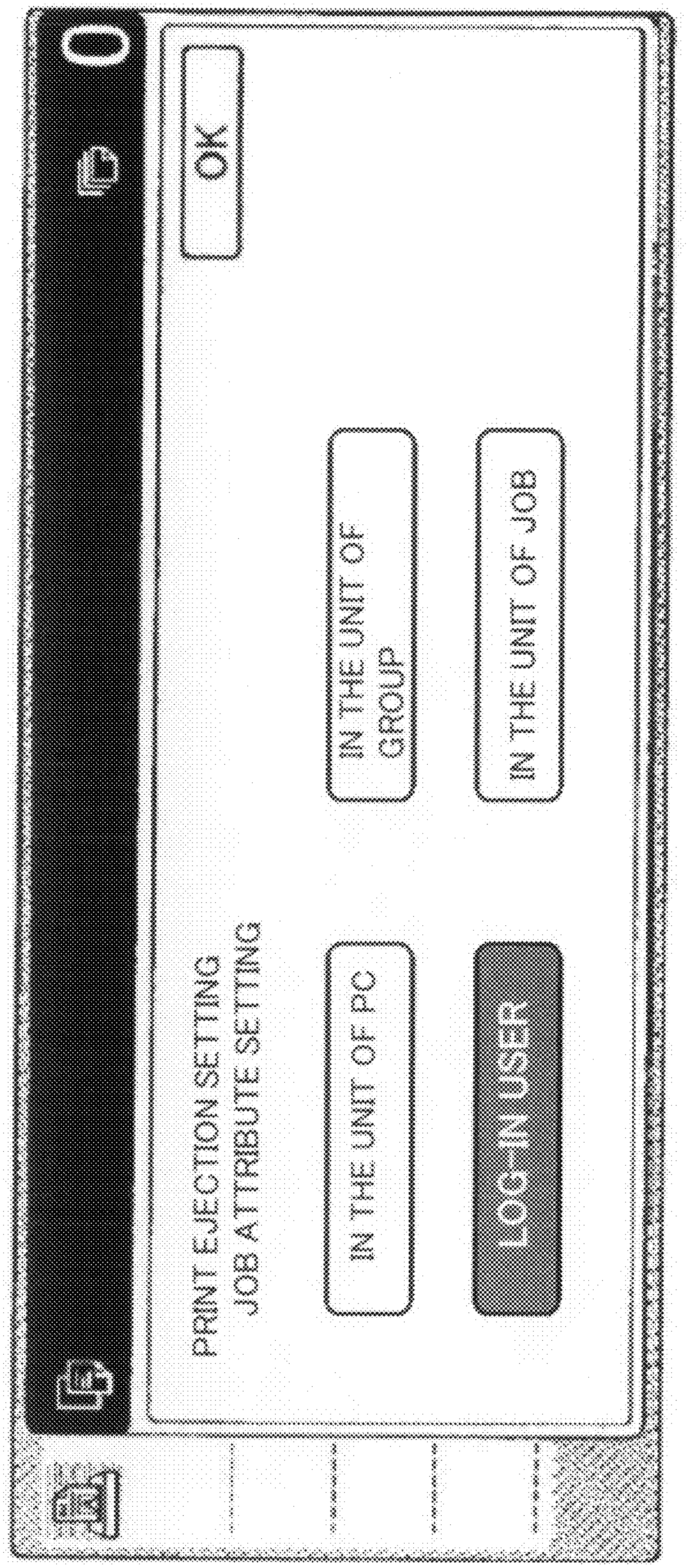
FIG. 7 is a view showing a setting screen for a job attribute.

In the setting screen of FIG. 6, a timing to execute the offset processing and the banner output can be set. When the user selects to execute the offset processing and the banner output at the time when the job attribute becomes different, a setting screen for the job attribute shown in FIG. 7 is displayed.

The user selects desired job information. Here, a user name is selected, and when the user becomes different, the job attribute becomes different. Note that, in the unit of a PC, job attributes are different for each of the information processing apparatuses 2 that are communicatively connected to the print output apparatus 1. In the unit of a group, the plurality of information processing apparatuses 2 are divided and registered in some working groups and job attributes are different for each group. In the unit of a job, job attributes are different for each print job.

Figure 8:
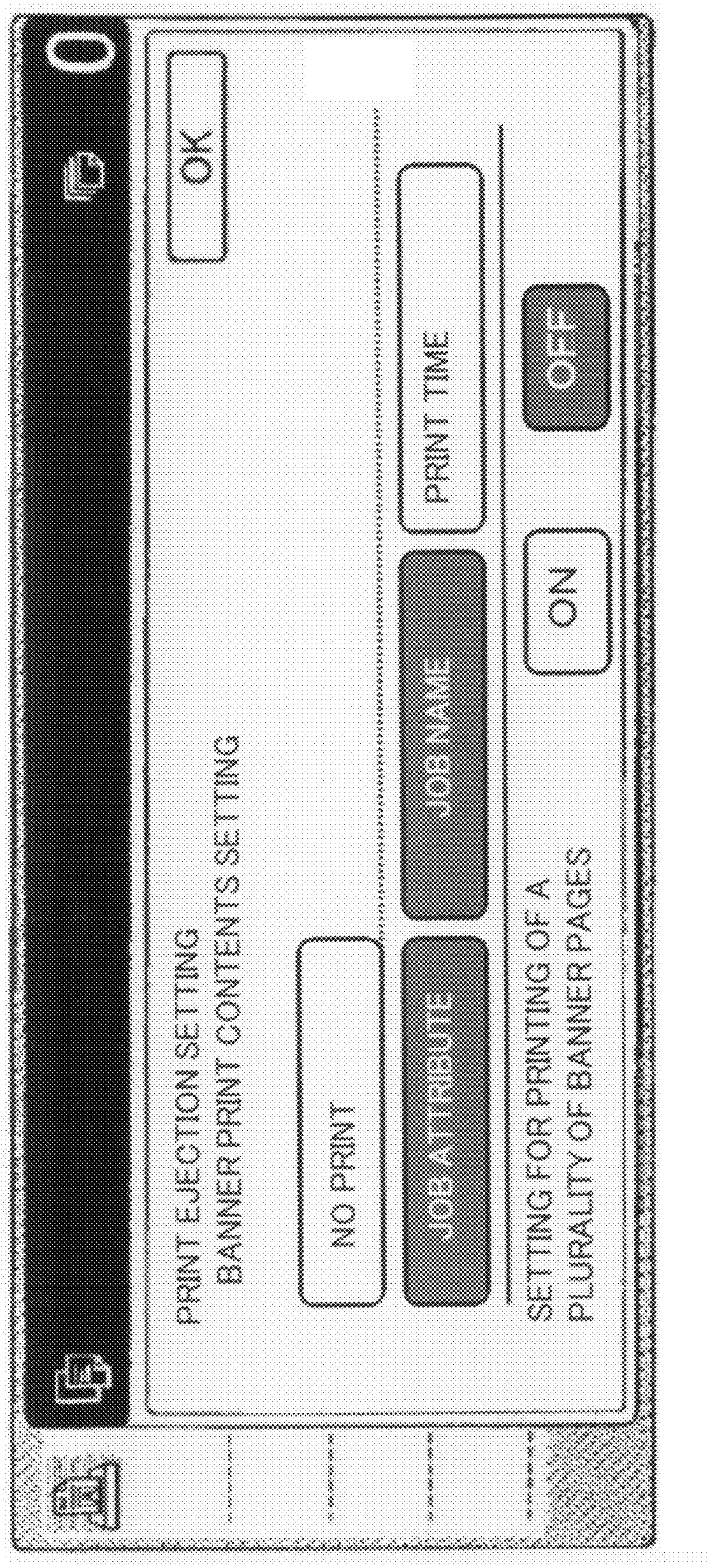
FIG. 8 is a view showing a setting screen for a print item of a banner page.

As shown in FIG. 8, a setting screen for items to be printed on the banner page is displayed. The user selects a desired item to be printed on the banner page. In addition, the user selects whether the banner page is printed on a plurality of pages or on a single page. In the case of a plurality of pages, all job information is recorded, thus the contents of the print job can be recognized quickly. In the case of a single page, even when there are a plurality of banner pages, only one banner page is printed, thus it is possible to prevent unnecessary use of sheets. The user selects either a plurality of pages or a single page depending on necessity of the banner page.

Figure 9:
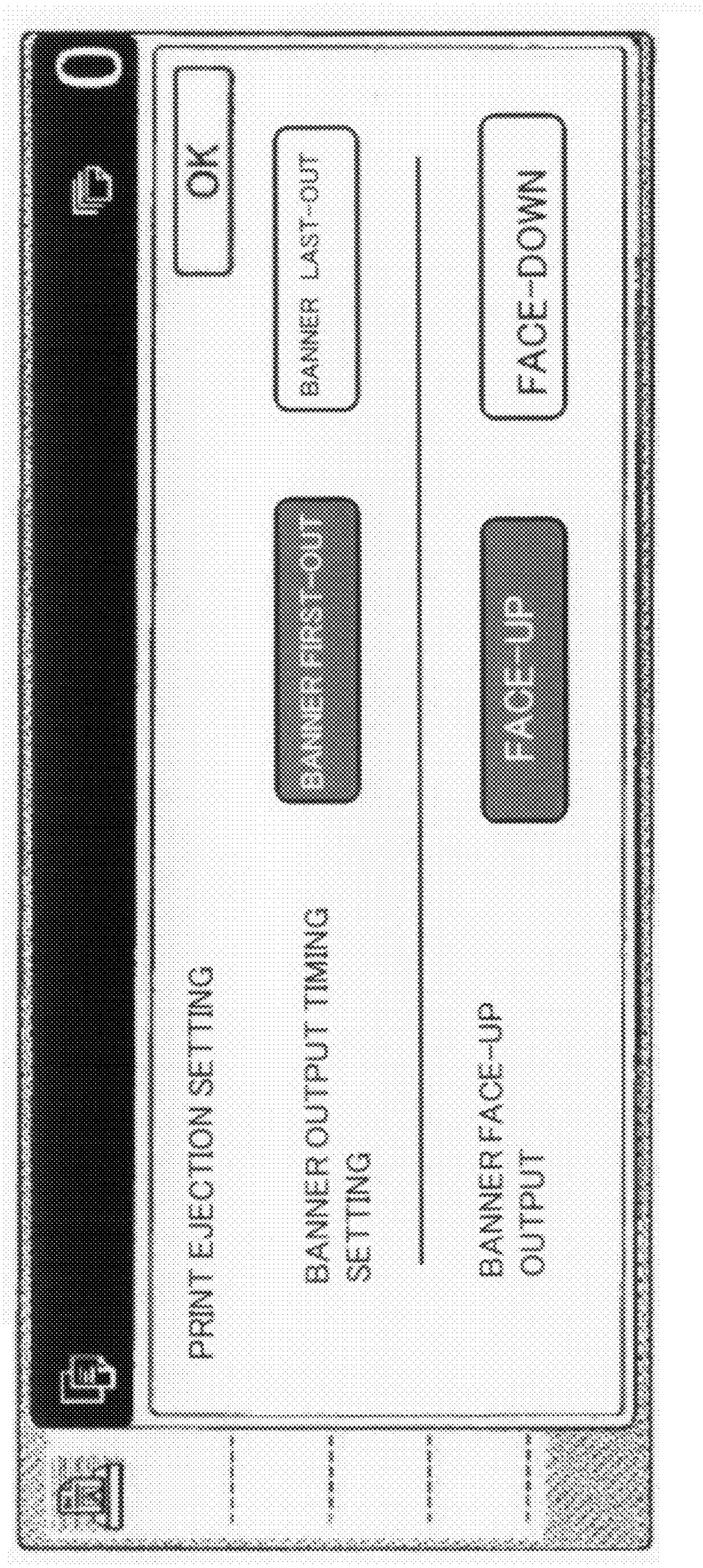
FIG. 9 is a view showing a setting screen for an output form of a banner page.

As shown in FIG. 9, a setting screen for an output form of the banner page is displayed. The user selects either first-out or last-out of the banner page, as well as selects either face-up or face-down.

In the case of a banner page first-out, job information relating to a first print job is recorded on the banner page. The banner page with respect to the subsequent print job is not outputted, thus it is possible to save a sheet. In the case of a banner page last-out, it is possible to record job information relating to all of the print jobs on the banner page. The user selects either first-out or last-out depending on necessity of the banner page.

In the case of face-up, the printed face of the banner page can be seen, thus the print jobs are easily classified. In the case of face-down, the printed face of the banner page can not be seen, thus it is possible to prevent other people from seeing the contents of the print job. The user selects either face-up or face-down, depending on an actual usage condition of the print output apparatus 1.

Figure 10:
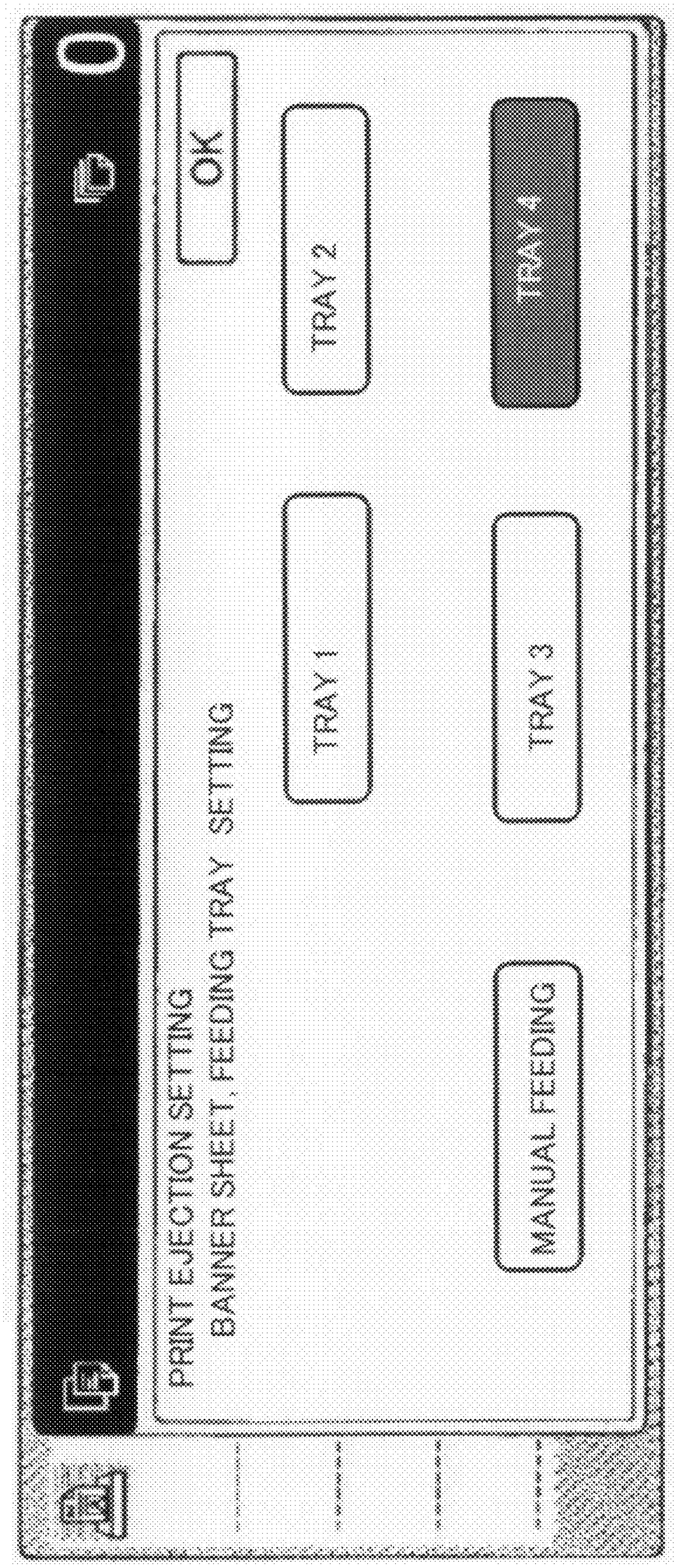
FIG. 10 is a view showing a setting screen for a sheet of a banner page.

Further, as shown in FIG. 10, a setting screen for a sheet on which the banner page is printed is displayed. The user selects the feeding tray 51 that contains a desired sheet. For example, the user selects the feeding tray 51 such that a sheet to be used for the print job is A4 and a sheet to be used for the banner page is B4, or different kinds of sheets such as a normal sheet, a heavy sheet, a white sheet and a color sheet are used. The banner page can be easily distinguished.

As described above, when the user performs the setting through the operation panel, the main control section 4 stores the inputted setting information in the information storage section 124, and when the print job is inputted, the separation mode is executed in accordance with the setting. Note that, the setting for the separation mode may be made in the information processing apparatus 2. The information processing apparatus 2 transmits the setting information to the print output apparatus 1 and the main control section 4 of the print output apparatus 1 receives the setting information.

In the information processing apparatus 2, when a print job is created, the information processing apparatus 2 outputs the print job to the print output apparatus 1. The print output apparatus 1 starts processing for the inputted print job. Note that, in the separation mode, first-out of the banner page is set. In addition, the setting of whether the banner page is ejected face-down or face-up, and the setting of whether the banner page is outputted on a single sheet or on a plurality of sheets are also made.

Figure 11:
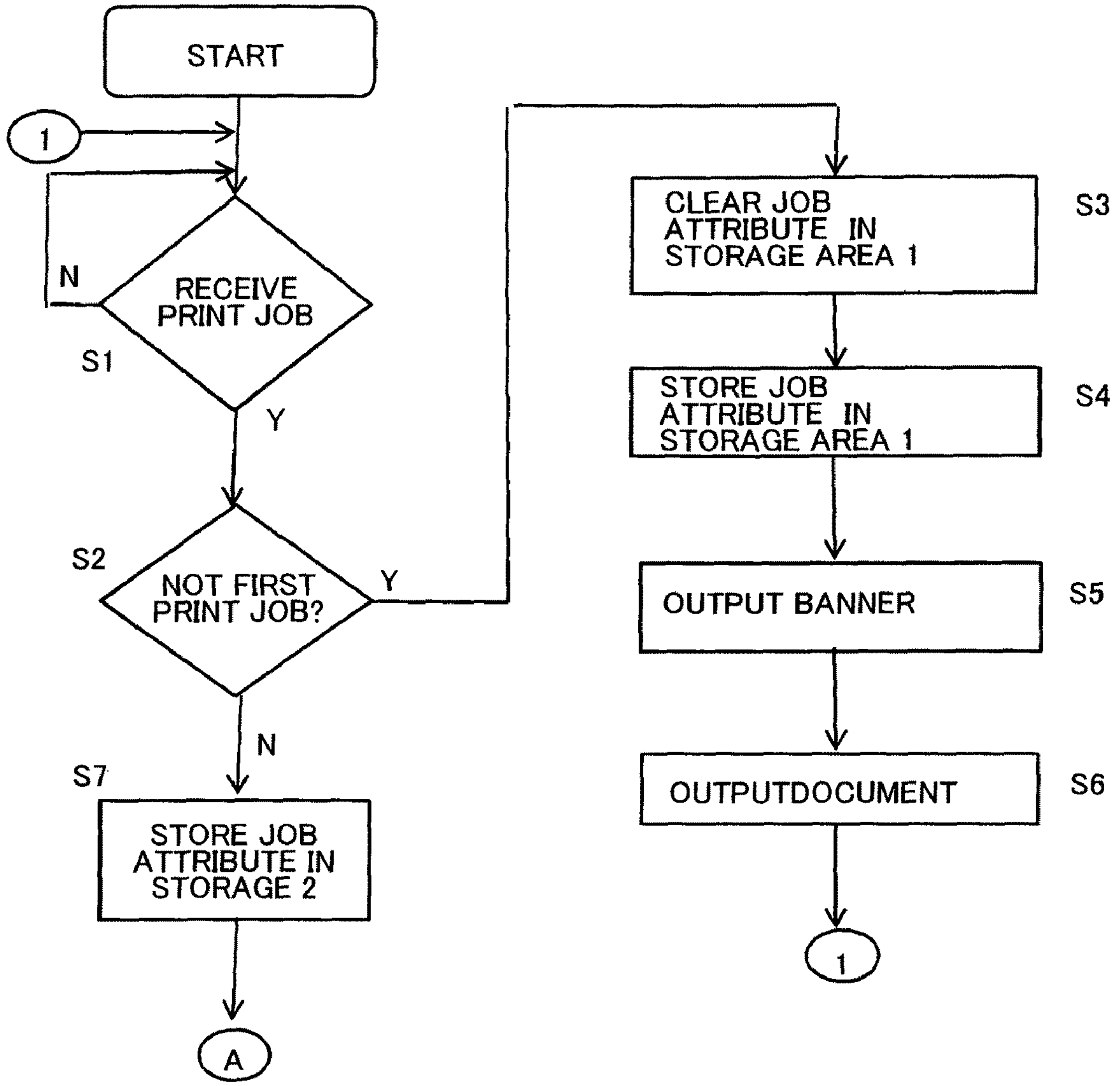
FIG. 11 is a flowchart when processing a print job in a banner page first-out.

As shown in FIG. 11, when the print output apparatus 1 receives a print job (S1), the main control section 4 confirms whether the print job is a first print job (S2). That is, the main control section 4 detects presence/absence of a sheet on the ejection tray 47, determines that the print job is not the first print job when there is a sheet, whereas determines that the print job is the first print job when there is no sheet.

When the print job is the first print job, the main control section 4 clears a job attribute stored in a storage area 1 of the information storage section 124 (S3). That is, the main control section 4 clears the job attribute of the preceding print job. The main control section 4 stores the job attribute of the received print job in the storage area 1 of the information storage section 124 (S4).

The main control section 4 creates a banner page in accordance with a setting for the separation mode and outputs image data of the banner page to the printing section 6 (S5). The printing section 6 prints the banner page on a sheet that has been set in advance, and ejects the sheet to the ejection tray 47. Thereafter, the main control section 4 prints the print job (S6). The sheet having the image printed thereon is ejected so as to be aligned with the banner page on the ejection tray 47.

When the print job is executed in this way and thereafter a next print job is inputted, the main control section 4 determines that the print job is not a first print job and stores the job attribute of the next print job in a storage area 2 of the information storage section 124 (S7). The information storage section 124 stores a job attribute of the preceding print job and the job attribute of the current print job.

Figure 12:
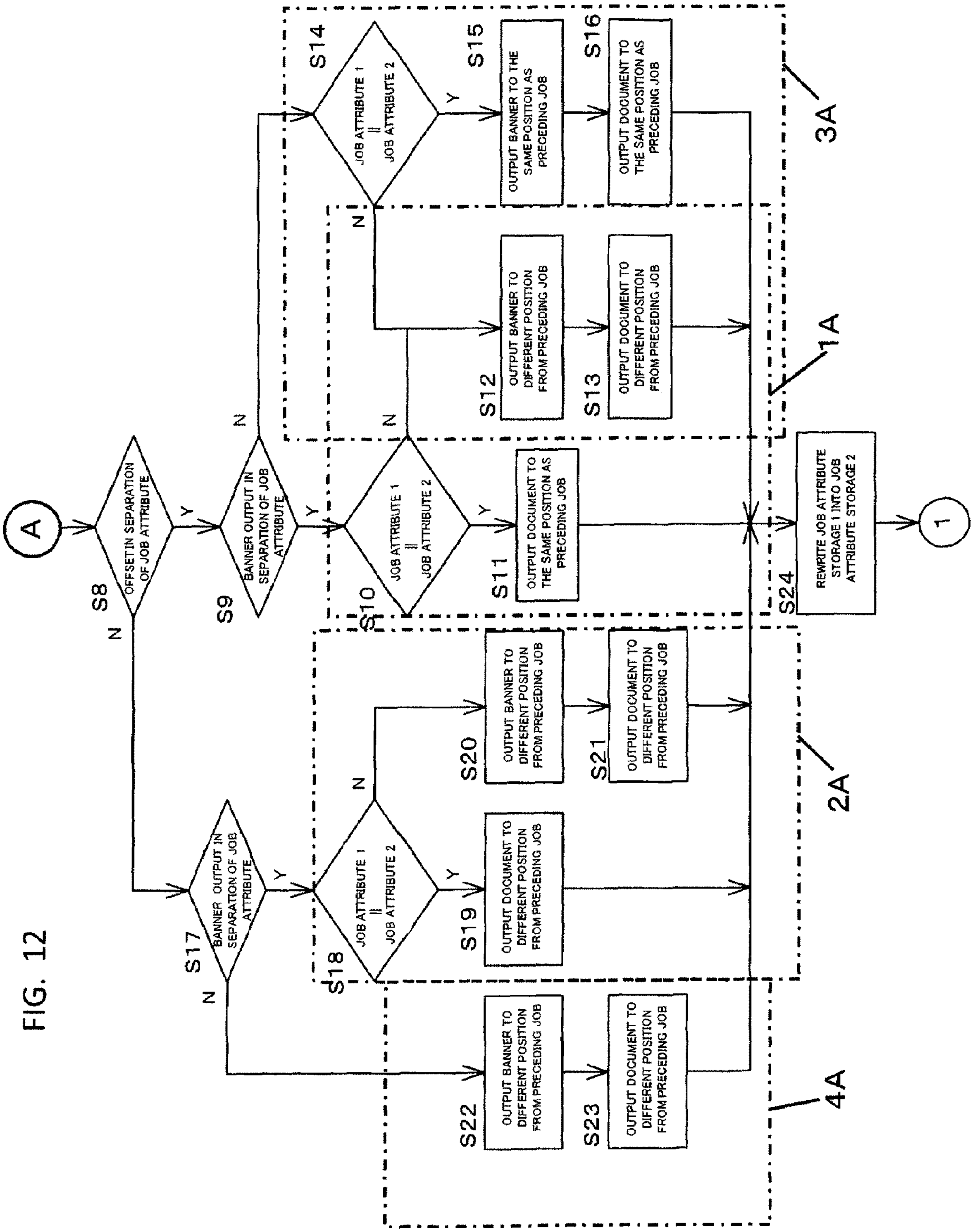
FIG. 12 is a flowchart when processing a print job in a banner page first-out.

As shown in FIG. 12, the main control section 4 confirms whether to execute the offset processing in the unit of a job attribute in the setting for the separation mode (S8). Further, the main control section 4 confirms whether to execute the banner output in the unit of a job attribute (S9).

When the offset processing and the banner output are executed in the unit of a job attribute, the delimit mode in the first pattern is executed. The main control section 4 compares the job attribute of the preceding printing job and the job attribute of the subsequent print job (S10). When the job attributes are the same, the print jobs are of the same user. In such a case, the main control section 4 executes the print job so as to execute neither the offset processing nor the banner output. As shown in FIG. 13 (1A), the printed sheet is ejected so as to be aligned with the sheet for the preceding print job (S11). The main control section 4 rewrites the job attribute of the storage area 1 into the job attribute of the storage area 2 (S24).

When a print job created by another user is inputted, the main control section 4 stores the job attribute of the print job in the storage area 2 (S7), and compares the job attribute of the preceding print job and the job attribute of the subsequent print job (S10). Since the preceding job attribute is different from the subsequent job attribute, the main control section 4 causes the offset processing and the banner output to be executed.

The main control section 4 creates a banner page for the new print job and the printing section 6 prints and outputs the banner page. The banner page is ejected to a different position (offset position B) from that of the sheet for the preceding print job (S12). Thereafter, the main control section 4 executes the print job. As shown in FIG. 13 (1A), printed sheets are ejected on the banner page at a position shifted from the sheet for the preceding print job (S13). Subsequently, when there is a printed sheet on the ejection tray 47, the offset processing and the banner output are executed in the unit of a job attribute.

When the offset processing is not executed in the unit of a job attribute at S8, in other words, when the offset processing is executed in the unit of a job, the main control section 4 confirms whether to execute the banner output in the unit of a job attribute (S17). When the banner output is executed in the unit of a job attribute, the separation mode in the second pattern is executed.

The main control section 4 compares the job attribute of the preceding print job and the job attribute of the subsequent print job (S18). When the job attributes are the same, the main control section 4 causes the offset processing to be executed. As shown in FIG. 13 (2A), sheets for print jobs are ejected to a position shifted from the sheet for the preceding print job (S19). The main control section 4 rewrites the job attribute of the storage area 1 into the job attribute of the storage area 2 (S24).

When a print job created by another user is inputted, the main control section 4 stores a job attribute of the print job in the storage area 2 (S7), and compares the job attribute of the preceding print job and the job attribute of the subsequent print job (S18). Since the preceding job attribute is different from the subsequent job attribute, the main control section 4 causes the offset processing and the banner output to be executed.

The main control section 4 creates a banner page for the new print job and the printing section 6 prints and outputs the banner page. The banner page is ejected to a different position from that of the sheet for the preceding print job (S20). Thereafter, the main control section 4 executes the print job. As shown in FIG. 13 (2A), printed sheets are ejected on the banner page at a position shifted from the sheet for the preceding print job (S21). Subsequently, when there is a printed sheet on the ejection tray 47, the banner output is executed in the unit of a job attribute and the offset processing is executed in the unit of a job.

When the banner output is not executed in the unit of a job attribute at S9, in other words, when the banner output is executed in the unit of a job, the separation mode in the third pattern is executed. The main control section 4 compares the job attribute of the preceding printing job and the job attribute of the subsequent print job (S14). When the job attributes are the same, the main control section 4 causes the banner output to be executed. As shown in FIG. 14 (3A), the banner page is ejected so as to be aligned with the sheet for the preceding print job (S15). The main control section 4 executes the print job. The printed sheet is ejected on the banner page and ejected so as to be aligned with the sheet for the preceding print job (S16). The main control section 4 rewrites the job attribute of the storage area 1 into the job attribute of the storage area 2 (S24).

When a print job created by another user is inputted, the main control section 4 stores a job attribute of the print job in the storage area 2 (S7) and compares the job attribute of the preceding print job and the job attribute of the subsequent print job (S14). Since the preceding job attribute is different from the subsequent job attribute, the main control section 4 causes the offset processing and the banner output to be executed.

The main control section 4 creates a banner page for the new print job and the printing section 6 prints and outputs the banner page. As shown in FIG. 14 (3A), the banner page is ejected to a different position (offset position B) from that of the sheets for the preceding print job (S12). Thereafter, the main control section 4 executes the print job. The printed sheet is ejected on the banner page at a position shifted from the sheet for the preceding print job (S13). Subsequently, when there is a printed sheet on the ejection tray 47, the offset processing is executed in the unit of a job attribute and the banner output is executed in the unit of a job.

When the banner output is not executed in the unit of a job attribute at S17, in other words, when the banner output is executed in the unit of a job, the separation mode in the fourth pattern is executed. The main control section 4 causes the offset processing and the banner output to be executed for each job. As shown in FIG. 14 (4A), the banner page is ejected so as to be shifted from the sheet for the preceding print job (S22). The sheet for the print job is ejected so as to be shifted from the banner page (S23). The main control section 4 rewrites the job attribute of the storage area 1 into the job attribute of the storage area 2 (S24). Subsequently, when a print job is inputted, regardless of its job attribute, the main control section 4 causes the offset processing and the banner output to be executed for each job.

Figure 15:
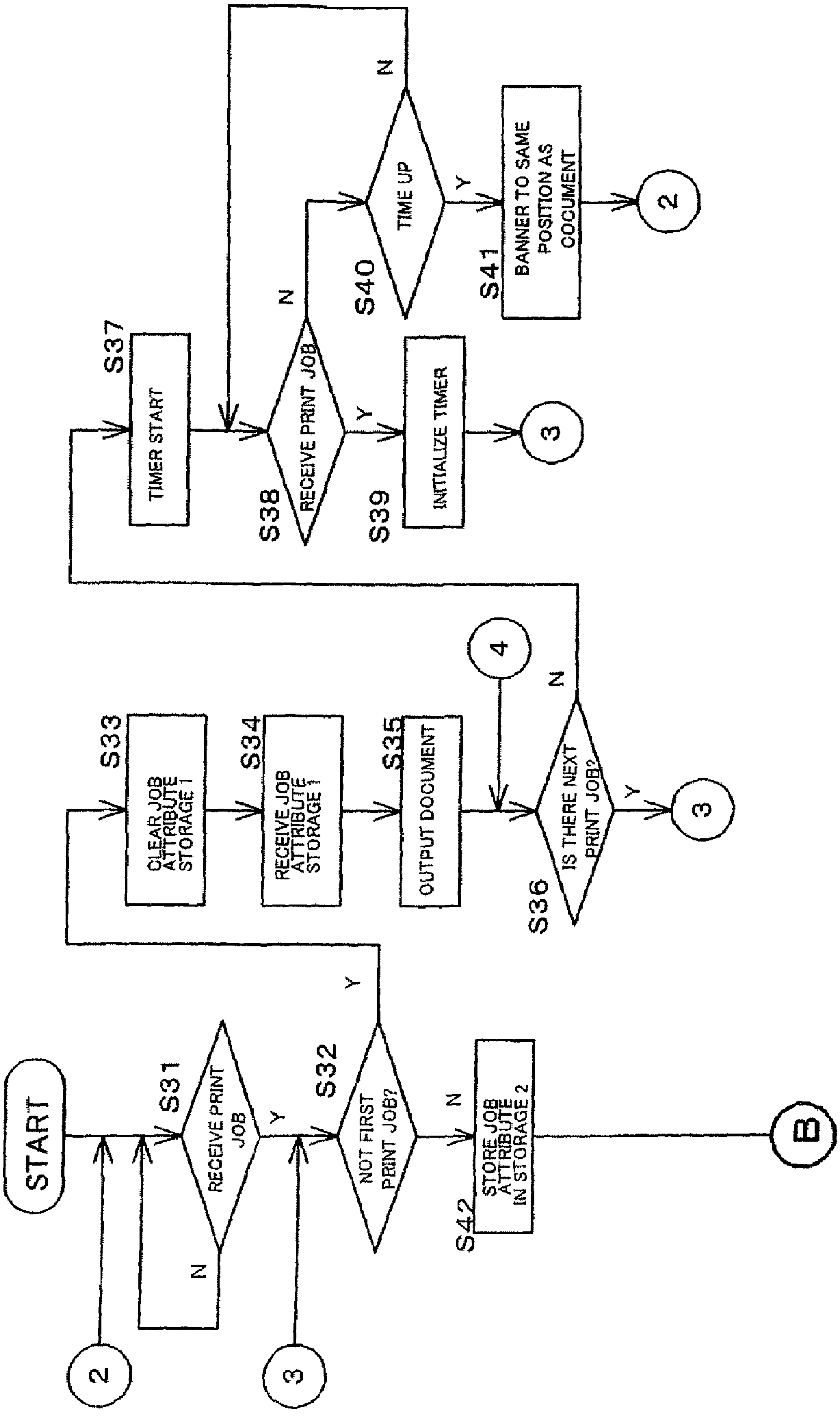
FIG. 15 is a flowchart when processing a print job in a banner page last-out.
Figure 16:
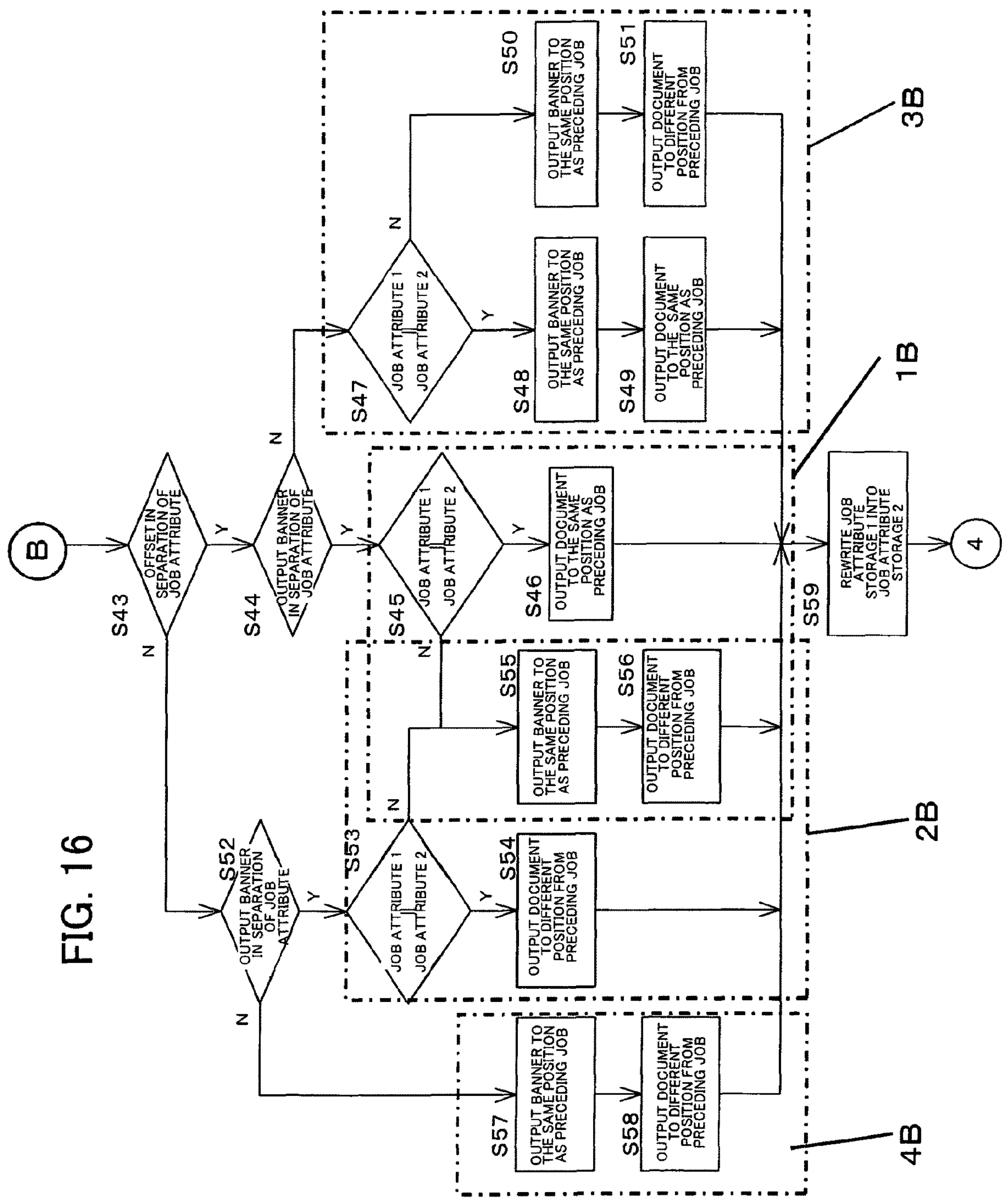
FIG. 16 is a flowchart when processing a print job in a banner page last-out.

Next, when last-out of the banner page is set in the separation mode, as shown in FIGS. 15 and 16, the print output apparatus 1 receives a print job (S31), and the main control section 4 confirms whether the print job is a first print job (S32).

When the print job is the first print job, the main control section 4 clears the job attribute stored in the storage area 1 of the information storage section 124 (S33) and stores the job attribute of the received print job in the storage area 1 of the information storage section 124 (S34).

The main control section 4 executes the print job. The printed sheet is ejected on the ejection tray 47 (S35). The main control section 4 confirms presence/absence of a next print job (S36). When there is no next print job, the main control section 4 starts a timer (S37). When a print job is inputted at this time (S38), the main control section 4 initializes the timer (S39). When the next print job is not inputted and the timer is timed up (S40), the main control section 4 determines that no print job having the same job attribute is inputted and causes the banner output to be executed. The banner page for the executed print job is outputted and the banner page is ejected so as to be aligned with the sheet of the ejection tray 47 (S41).

When a next print job is inputted, the main control section 4 stores a job attribute of the print job in the storage area 2 of the information storage section 124 (S42). The main control section 4 confirms whether to execute the offset processing in the unit of a job attribute in the setting for the separation mode (S43). Further, the main control section 4 confirms whether to execute the banner output in the unit of a job attribute (S44).

When the offset processing and the banner output are executed in the unit of a job attribute, the delimit mode in the first pattern is executed. The main control section 4 compares the job attribute of the preceding print job and the job attribute of the subsequent print job (S45). When the job attributes are the same, the main control section 4 executes the print job so as to execute neither the offset processing nor the banner output. As shown in FIG. 17 (1B), printed sheets are ejected so as to be aligned with the sheet for the preceding print job (S46). The main control section 4 rewrites the job attribute of the storage area 1 into the job attribute of the storage area 2 (S59).

When a print job created by another user is inputted, the main control section 4 stores a job attribute of the print job in the storage area 2 (S42), and compares the job attribute of the preceding print job and the job attribute of the subsequent print job (S45). Since the preceding job attribute is different from the subsequent job attribute, the main control section 4 causes the offset processing and the banner output to be executed.

The main control section 4 creates a banner page for the preceding print job and the printing section 6 prints and outputs the banner page. As shown in FIG. 17 (1B), the banner page is ejected on the sheet for the preceding print job (S55). Thereafter, the main control section 4 executes the print job. The printed sheet is ejected to a position shifted from the banner page (offset position B) (S56). Subsequently, when there is a printed sheet on the ejection tray 47, the offset processing and the banner output are executed in the unit of a job attribute.

When the offset processing is not executed in the unit of a job attribute at S43, in other words, when the offset processing is executed in the unit of a job, the main control section 4 confirms whether to execute the banner output in the unit of a job attribute (S52). When the banner output is executed in the unit of a job attribute, the separation mode in the second pattern is executed.

The main control section 4 compares the job attribute of the preceding print job and the job attribute of the subsequent print job (S53). When the job attributes are the same, the main control section 4 causes the offset processing to be executed. As shown in FIG. 17 (2B), sheets for the print job are ejected to a position shifted from the sheet for the preceding print job (S54). The main control section 4 rewrites the job attribute of the storage area 1 into the job attribute of the storage area 2 (S59).

When a print job created by another user is inputted, the main control section 4 stores the job attribute of the print job in the storage area 2 (S42), and compares the job attribute of the preceding print job and the job attribute of the subsequent print job (S53). Since the preceding job attribute is different from the subsequent job attribute, the main control section 4 causes the offset processing and the banner output to be executed.

The main control section 4 creates a banner page for the preceding print job and the printing section 6 prints and outputs the banner page. The banner page is ejected on the sheet for the preceding print job (S55). Thereafter, the main control section 4 executes the print job. As shown in FIG. 17 (2B), printed sheets are ejected to a position shifted from the sheet for the preceding print job (S56). Subsequently, when there is a printed sheet on the ejection tray 47, the banner output is executed in the unit of a job attribute and the offset processing is executed in the unit of a job.

When the banner output is not executed in the unit of a job attribute at S44, in other words, when the banner output is executed in the unit of a job, the separation mode in the third pattern is executed. The main control section 4 compares the job attribute of the preceding print job and the job attribute of the subsequent print job (S47). When the job attributes are the same, the main control section 4 causes the banner output to be executed. As shown in FIG. 18 (3B), the banner page is ejected so as to be aligned with the sheet for the preceding print job (S48). The main control section 4 executes the print job. The printed sheet is ejected on the banner page and ejected so as to be aligned with the sheet for the preceding print job (S49). The main control section 4 rewrites the job attribute of the storage area 1 into the job attribute of the storage area 2 (S59).

When a print job created by another user is inputted, the main control section 4 stores a job attribute of the print job in the storage area 2 (S42), and compares the job attribute of the preceding print job and the job attribute of the subsequent print job (S47). Since the preceding job attribute is different from the subsequent job attribute, the main control section 4 causes the offset processing and the banner output to be executed.

The main control section 4 creates a banner page for the preceding print job and the printing section 6 prints and outputs the banner page. As shown in FIG. 18 (3B), the banner page is ejected on the sheet for the preceding print job (S50). Thereafter, the main control section 4 executes the print job. The printed sheet is ejected to a position shifted from the banner page (S51). Subsequently, when there is a printed sheet on the ejection tray 47, the offset processing is executed in the unit of a job attribute and the banner output is executed in the unit of a job.

When the banner output is not executed in the unit of a job attribute at S52, in other words, when the banner output is executed in the unit of a job, the separation mode in the fourth pattern is executed. The main control section 4 causes the offset processing and the banner output to be executed for each job. As shown in FIG. 18 (4B), the banner page is ejected on the sheet for the preceding print job (S57). The sheets for the print job are ejected so as to be shifted from the banner page (S58). The main control section 4 rewrites the job attribute of the storage area 1 into the job attribute of the storage area 2 (S59). Subsequently, when a print job is inputted, regardless of the job attribute, the main control section 4 causes the offset processing and the banner output to be executed for each job.

As described above, by executing the offset processing and the banner output in the unit of a job attribute, it is possible to put together and output the sheets for relevant print jobs. For example, when a plurality of users perform respective printings, the outputted sheets are ejected for each user so that the sheets can be distinguished easily. Thereby, the users are able to obtain the sheets of each user collectively.

Note that, the present invention will not be limited to the above described embodiments, and many modifications and alterations can certainly be added to the above described embodiments within the scope of the present invention. The print output apparatus may be a multifunctional peripheral, a copier or a printer. In addition, the print job is not limited to printing, but may be one by copying or a facsimile reception. In the case of copying, the job attribute includes a user and the number of print sheets. In the case of a facsimile, the job attribute includes a transmitter.

What is claimed is:

1. A print output apparatus that prints and outputs an image of an inputted print job on a sheet, comprising:

an offset processing section that performs offset processing for shifting the sheet to be outputted in a sheet width direction;

a banner output section that prints a job attribute of a print job on the sheet;

a job attribute determination section that determines the job attribute of the print job; and a control section that sets offset processing and banner output in the unit of a job attribute and in the unit of a job, wherein the control section causes offset processing and banner output to be executed, when a job attribute of a preceding print job and a job attribute of a subsequent print job are different.

2. The print output apparatus according to claim 1, wherein:

the control section causes any one of offset processing and banner output to be executed, when the job attribute of the preceding print job and the job attribute of the subsequent print job are the same.

3. The print output apparatus according to claim 1, wherein:

the control section causes offset processing to be executed in the unit of a job as well as causes banner output to be executed in the unit of a job attribute.

4. The print output apparatus according to claim 1, wherein:

the control section causes banner output to be executed in the unit of a job as well as causes offset processing to be executed in the unit of a job attribute.

5. The print output apparatus according to claim 1, wherein:

the control section causes offset processing and banner output not to be executed, when the job attribute of the preceding print job and the job attribute of the subsequent print job are the same.

6. The print output apparatus according to claim 1, wherein:

banner output is executed before a first page of the print job is outputted, or executed after a last page of the print job is outputted.

7. The print output apparatus according to claim 5, wherein:

the control section sets whether to execute banner output before outputting the first page of a print job or after outputting the last page of a print job.

8. The print output apparatus according to claim 1, wherein:

the sheet subjected to banner output is ejected either face-up or face-down.

9. The print output apparatus according to claim 8, wherein:

the control section sets whether to eject the sheet face-up or face-down.

10. The print output apparatus according to claim 1, wherein:

the sheet subjected to banner output is different in kind from the sheet on which the image of the print job is printed.

11. The print output apparatus according to claim 1, wherein:

the control section sets whether banner output is executed on a single sheet or on a plurality of sheets.

12. The print output apparatus according to claim 1, wherein:

the control section performs a setting by input from an operation panel.

13. A print output system, wherein an information processing apparatus is connected through a network to a print output apparatus that prints and outputs an image of an inputted print job on the sheet, and the print output apparatus includes:

an offset processing section that performs offset processing for shifting the sheet to be outputted in a sheet width direction;

a banner output section that prints a job attribute of a print job on the sheet;

a job attribute determination section that determines the job attribute of the print job; and a control section that sets offset processing and banner output in the unit of a job attribute and in the unit of a job, wherein the control section performs a setting by input from the information processing apparatus, and, wherein the control section causes offset processing and banner output to be executed, when a job attribute of a preceding print job and a job attribute of a subsequent print job are different.

14. The print output system according to claim 13, wherein:

the control section causes any one of offset processing and banner output to be executed, when the job attribute of the preceding print job and the job attribute of the subsequent print job are the same.

15. The print output system according to claim 13, wherein:

the control section causes offset processing to be executed in the unit of a job as well as causes banner output to be executed in the unit of a job attribute.

16. The print output system according to claim 13, wherein:

the control section causes banner output to be executed in the unit of a job as well as causes offset processing to be executed in the unit of a job attribute.

17. The print output system according to claim 13, wherein:

the control section causes offset processing and banner output not to be executed, when the job attribute of the preceding print job and the job attribute of the subsequent print job are the same.

* * * * *